United States Patent
Mohare et al.

(10) Patent No.: US 12,300,214 B2
(45) Date of Patent: May 13, 2025

(54) ASSEMBLIES FOR GENERATION OF SOUND

(71) Applicant: Pradnesh Mohare, Kenner, LA (US)

(72) Inventors: Pradnesh Mohare, Kenner, LA (US); Rahul Khopkar, Burnaby (CA)

(73) Assignee: Pradnesh Mohare, Kenner, LA (US)

( * ) Notice: Subject to any disclaimer, the term of this patent is extended or adjusted under 35 U.S.C. 154(b) by 0 days.

(21) Appl. No.: 17/674,428

(22) Filed: Feb. 17, 2022

(65) Prior Publication Data

US 2022/0223139 A1 Jul. 14, 2022

Related U.S. Application Data

(63) Continuation of application No. 16/339,562, filed as application No. PCT/IN2017/050449 on Oct. 4, 2017, now Pat. No. 11,289,065.

(Continued)

(51) Int. Cl.
*H04R 19/02* (2006.01)
*G06F 13/10* (2006.01)
(Continued)

(52) U.S. Cl.
CPC .............. *G10K 15/02* (2013.01); *G06F 13/10* (2013.01); *H04R 3/04* (2013.01); *H04R 7/125* (2013.01);
(Continued)

(58) Field of Classification Search
CPC . H04R 7/00; H04R 7/04; H04R 7/125; H04R 2207/00
See application file for complete search history.

(56) References Cited

U.S. PATENT DOCUMENTS 1,534,911 A * 4/1925 Browne ................... H04R 9/10
381/399
1,638,245 A * 8/1927 Charles ................... H04R 7/12
381/396
(Continued)

FOREIGN PATENT DOCUMENTS

CN 1977564 A 6/2007
JP S 52-3423 A 1/1977
(Continued)

OTHER PUBLICATIONS

Anonymous: "Electrostatic loudspeaker—Wikipedia", Oct. 20, 2015, XP055713954, Retrieved from the Internet: URL: https://en.wikipedia.org/w/index.php?title=Electrostatic_loudspeaker&oldid=686591917 [retrieved on Jul. 13, 2020].
(Continued)

*Primary Examiner* — Suhan Ni
(74) *Attorney, Agent, or Firm* — Budzyn IP Law, LLC

(57) ABSTRACT

The invention provides assemblies for production of sound using a plurality of configurations, including in one embodiment, surfaces that may be fixed or moveable relative to each other. These surfaces may be electromagnetic, electrostatic, piezoelectric, transducer implemented, thermally activated, permanently magnetized, or activated by any other means, including but not limited to mechanical activation. The surfaces may in a variety of configurations be free floating, constrained, levitated or combinations thereof. The surfaces themselves may be foldable, rollable, expandable, specialized or any combinations thereof.

16 Claims, 37 Drawing Sheets

Related U.S. Application Data

(60) Provisional application No. 62/404,093, filed on Oct. 4, 2016.

(51) Int. Cl.

| | | |
|---|---|---|
| *G10K 15/02* | (2006.01) | |
| *H04R 3/04* | (2006.01) | |
| *H04R 7/10* | (2006.01) | |
| *H04R 7/12* | (2006.01) | |
| *H04R 7/14* | (2006.01) | |
| *H04R 7/16* | (2006.01) | |

(52) U.S. Cl.
CPC ................ *H04R 7/14* (2013.01); *H04R 7/16* (2013.01); *H04R 19/02* (2013.01)

(56) References Cited

U.S. PATENT DOCUMENTS

| | | | |
|---|---|---|---|
| 1,759,328 A | | 5/1930 | Smythe |
| 1,786,465 A | * | 12/1930 | Van Wagenen ........ H04R 11/02 381/418 |
| 1,919,632 A | * | 7/1933 | Haigis ...................... H04R 7/16 381/431 |
| 2,429,068 A | * | 10/1947 | McIver .................. H04R 23/00 74/25 |
| 3,859,477 A | | 1/1975 | Skvor |
| 5,727,076 A | * | 3/1998 | Paddock ................ H04R 17/00 381/174 |
| 5,825,902 A | | 10/1998 | Fujishima |
| 6,198,831 B1 | | 3/2001 | Azima et al. |
| 6,480,614 B1 | | 11/2002 | Denda et al. |
| 8,009,845 B2 | | 8/2011 | Sakurai et al. |
| 8,284,967 B2 | | 10/2012 | Yang et al. |
| 2007/0098207 A1 | | 5/2007 | Lin |
| 2016/0014518 A1 | | 1/2016 | Liu |

FOREIGN PATENT DOCUMENTS

| | | |
|---|---|---|
| JP | S 53-45227 A | 4/1978 |
| JP | S 54-87501 A | 7/1979 |
| JP | S55-135788 A | 10/1980 |
| JP | S 56-19297 A | 2/1981 |
| JP | S 63-94731 A | 4/1988 |
| JP | H 2-306800 A | 12/1990 |
| JP | H 8-9497 A | 1/1996 |
| JP | H 11-113086 A | 4/1999 |
| JP | 2009-278171 A | 11/2009 |
| JP | S 46-17840 B | 1/2011 |
| JP | 2011-151599 A | 8/2011 |
| KR | 10-2007-0035494 A | 3/2007 |
| KR | 10-2015-0050829 A | 5/2015 |
| WO | 0035246 A1 | 6/2000 |
| WO | 2015064871 A1 | 5/2015 |

OTHER PUBLICATIONS

Anonymous: "Magnetostatic loudspeaker—Wikipedia", Jun. 6, 2016, XP055713957, Retrieved from the Internet: URL: https://en.wikipedia.org/w/index.php?title=Magnetostatic_loudspeaker&oldid=724004616 [retrieved on Jul. 13, 2020].

International Search Report for corresponding PCT Application No. PCT/IN2017/050449 dated Jan. 11, 2018.

* cited by examiner

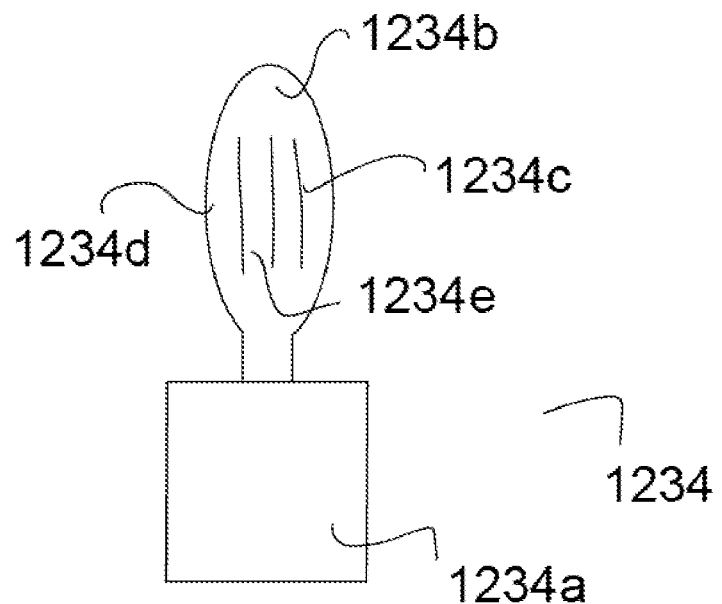
Figure 12T
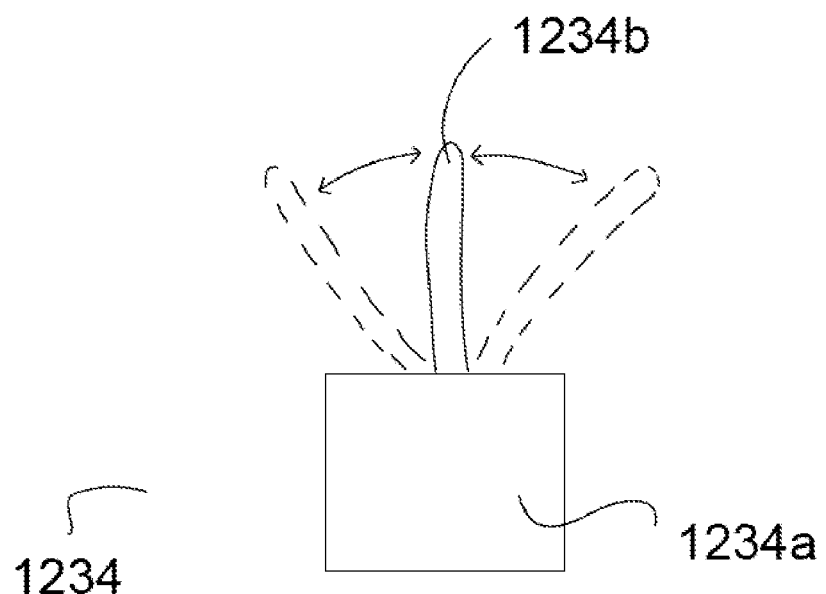
Figure 12T-T

ASSEMBLIES FOR GENERATION OF SOUND

CROSS-REFERENCE TO RELATED APPLICATIONS

This application is a continuation of U.S. patent application Ser. No. 16/339,562, filed Apr. 4, 2019, now allowed, which is a National Stage filing under 35 U.S.C. § 371 of PCT Application No. PCT/IN2017/050449, filed Oct. 4, 2017, which claims priority to U.S. Provisional Patent Application No. 62/404,093 filed Oct. 4, 2016, the contents of which are incorporated by reference herein.

FIELD OF INVENTION

The invention relates to sound production and sound generation. In particular, the invention relates to novel structures and assemblies for generation of sound, including without limitation speaker assemblies.

BACKGROUND

Conventional microphones and speakers use a variety of materials and configurations. One commonly used type of microphone/speaker assembly is a voice coil based assembly comprising at least a wound coil, magnet(s) and a diaphragm affixed to one of the coil and the magnet(s). In operation as a speaker, excitation of the coil creates a magnetic field which causes relative movement between the magnet and the coil—in turn causing the diaphragm to move, and resulting in generation of sound.

Another common speaker configuration is an electrostatic speaker, wherein a magnetic field sensitive diaphragm is positioned between two stators. Excitation of the pair of stators with an electric current of alternating polarity generates an alternating electric field, causing the diaphragm to move between the two stators, and resulting in generation of sound.

There is however a need for speaker assemblies that improve fidelity of sound output, while offering advantages of higher sensitivity, smaller size, lower weight, simpler design and structure, lower costs, improved manufacturing efficiencies, and form factors, and/or applications not previously possible.

SUMMARY

The invention provides an assembly for generating sound. The assembly comprises a first surface coupled with an electromagnetic/electrostatic field generating structure, and a second surface coupled with an electromagnetic/electrostatic field sensitive structure. The first surface and the second surface may be interspaced from each other, such that responsive to generation of an electromagnetic/electrostatic field by the electromagnetic/electrostatic field generating structure, at least one of the first surface and the second surface is impelled to move relative to the other of the first surface and the second surface.

The first surface and the second surface may be coaxially disposed annular surfaces. In an embodiment, one of the first surface and the second surface comprises a diaphragm. In a more specific embodiment, one of the first surface and the second surface comprises a diaphragm having an extensible structure.

The first surface and the second surface may be interconnected by a plurality of resilient tethers.

In an embodiment where one of the first surface and the second surface comprises a diaphragm, said diaphragm comprising a plurality of flexibly interconnected diaphragm segments.

Each of the first surface and the second surface may be mounted on opposite sides of a spacer, such that said first surface and second surface are interspaced relative to each other.

One or both of the first surface and the second surface may comprise a spiral surface.

At least one of the first surface and second surface may be provided with one or more surface rigidity adjusters.

In an embodiment where one of the first surface and the second surface is a diaphragm, said diaphragm may have charged particles or charged layer or magnetically sensitive particles or magnetically sensitive layer disposed thereon.

The diaphragm may comprise one or more layers of charged particles or magnetically sensitive particles with each such layer of charged particles or magnetically sensitive particles disposed between two diaphragm substrate layers.

In an embodiment, one of the first surface and the second surface comprises a diaphragm having one or more electrically conductive structures additively or subtractively formed thereon.

One of the first surface and the second surface may comprise a diaphragm having one or more electrically conductive structures with each conductive structure disposed between two diaphragm substrate layers.

In an embodiment where one of the first surface and the second surface comprises a diaphragm, said diaphragm may comprise an electrically conductive mesh structure having non-electrically conductive filler material interspaced between conductive elements of said mesh structure, wherein an external periphery of filler material within each interspace is separated from an external periphery of filler material within at least one adjacent interspace.

In another embodiment where one of the first surface and the second surface comprises a diaphragm, said diaphragm comprises an electrically conductive mesh structure, and having air gap interspaces between conductive elements of said mesh structure.

One of the first surface and the second surface may include an electrically conductive structure disposed thereon, while the other of the first surface and the second surface may include an electromagnetic field sensitive structure disposed thereon, wherein the electrically conductive structure and the electromagnetic field sensitive structure have substantially identically structures.

In a further embodiment where one of the first surface and the second surface comprises a diaphragm, said diaphragm may have a plurality of electrically conductive structures disposed thereon, wherein each of the plurality of electrically conductive structures is electrically isolated from the others.

One of the plurality of electrically conductive structures may be configured to carry a current, and at least one of the plurality of electrically conductive structures may be isolated from any externally applied current.

In a more particular embodiment, one of the plurality of electrically conductive structures is configured to carry a first current, and another of the plurality of electrically conductive structures is configured to carry a second current, wherein the first current and the second current are electrically isolated from each other.

One of the plurality of electrically conductive structures may have different structural characteristics in comparison with at least one other of the plurality of electrically conductive structures.

In a specific embodiment where one of the first surface and the second surface comprises a diaphragm, said diaphragm may having a first cross-sectional thickness, and at least one additional diaphragm region having a cross-sectional thickness not equal to first cross-sectional width.

In an embodiment of the assembly one of the first surface and the second surface comprises a diaphragm, wherein said diaphragm is configured as an input diaphragm.

In another embodiment of the assembly, one of the first surface and the second surface comprises a diaphragm, and said diaphragm is configured as a microphone diaphragm.

One of the plurality of independent conductive structures may be connected to a first input signal stream corresponding to a first audio channel, and another of the plurality of independent conductive structures may be connected to a second input signal stream corresponding to a second audio channel.

In an embodiment where one of the first surface and the second surface comprises a diaphragm, said diaphragm may comprise a plurality of non-porous membranes sealed together to form a fluid tight compartment, wherein said fluid tight compartment is expanded using gas at above atmospheric pressure. The boundaries of said fluid tight compartment may be defined by one or more of a rigid spacer over which the plurality of non-porous membranes are mounted, and one or more fasteners that define a periphery of said fluid tight compartment.

In another embodiment, the invention may comprise an assembly for generating sound. The assembly may comprise (i) one or more wave generating surfaces configured such that movement of said wave generating surfaces generates a sound wave, wherein said one or more wave generating surfaces are configured for any one of reciprocating motion, cyclical motion, rotational motion or elliptical motion (ii) a driver configured for driving one or more of the wave generating surfaces from a first position to a second position motion for generating audible sound, and (iii) one or more actuators configured to modify any of (a) an airflow characteristic of one or more of the wave generating surfaces or (b) direction or rate of motion of one or more of the wave generating surfaces.

BRIEF DESCRIPTION OF THE ACCOMPANYING DRAWINGS

Figure 12A:
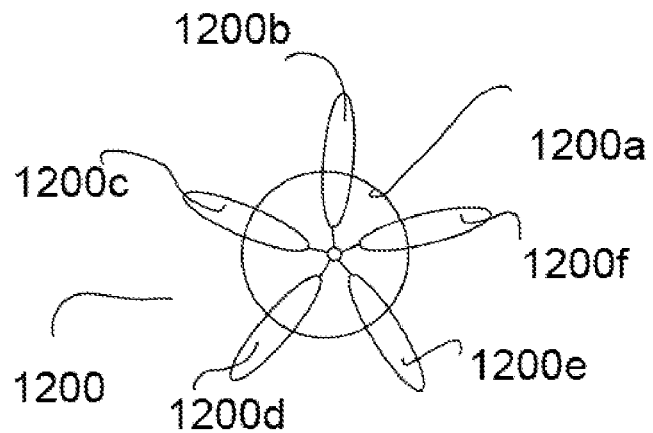
FIG. 12A to 12R illustrate embodiments of rotary speaker assemblies and components thereof.
Figure 12C:
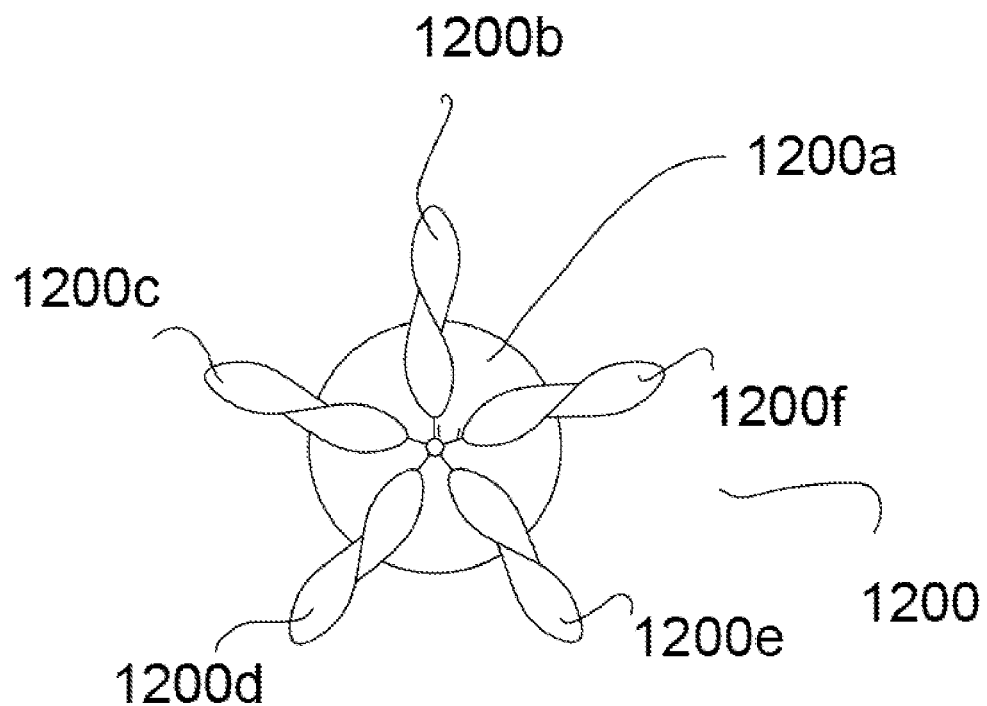
Figure 12B:
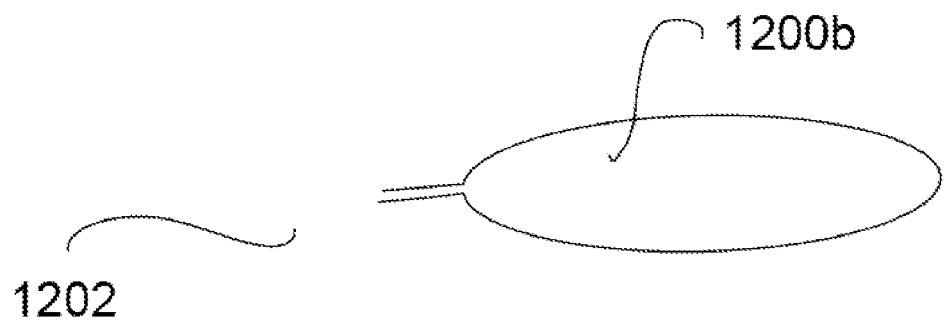
Figure 12D:
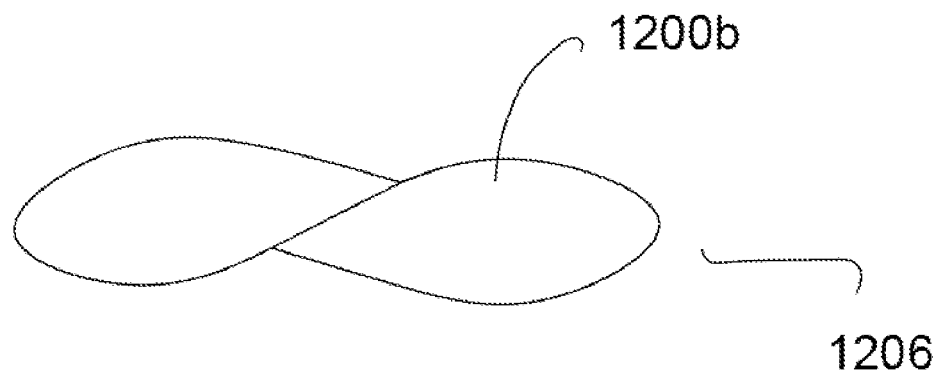
Figure 12E:
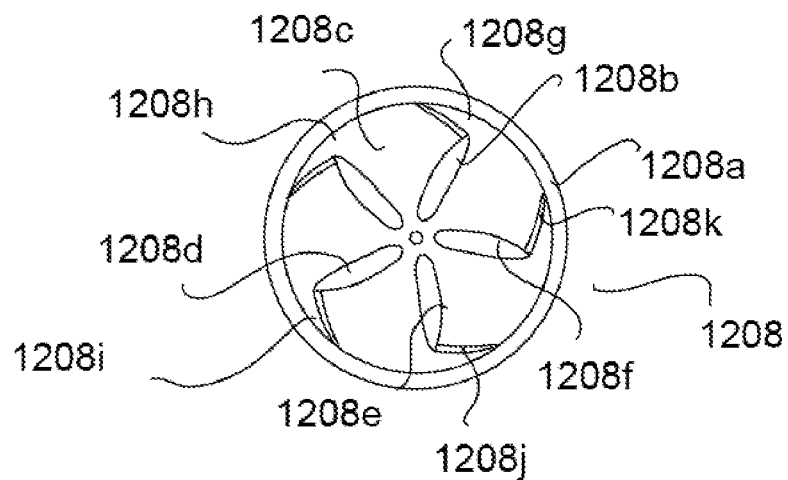
Figure 12F:
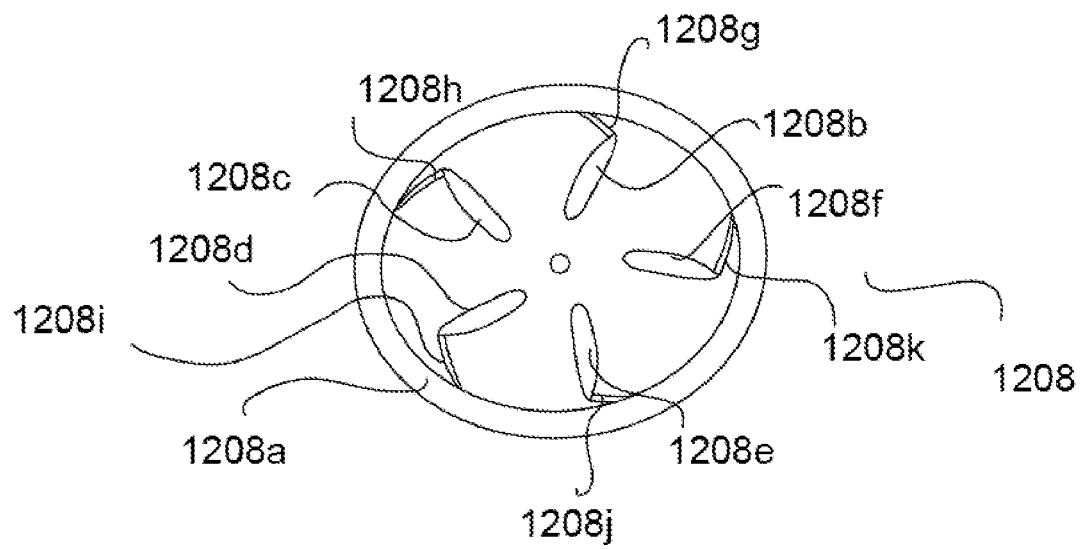
Figure 12G:
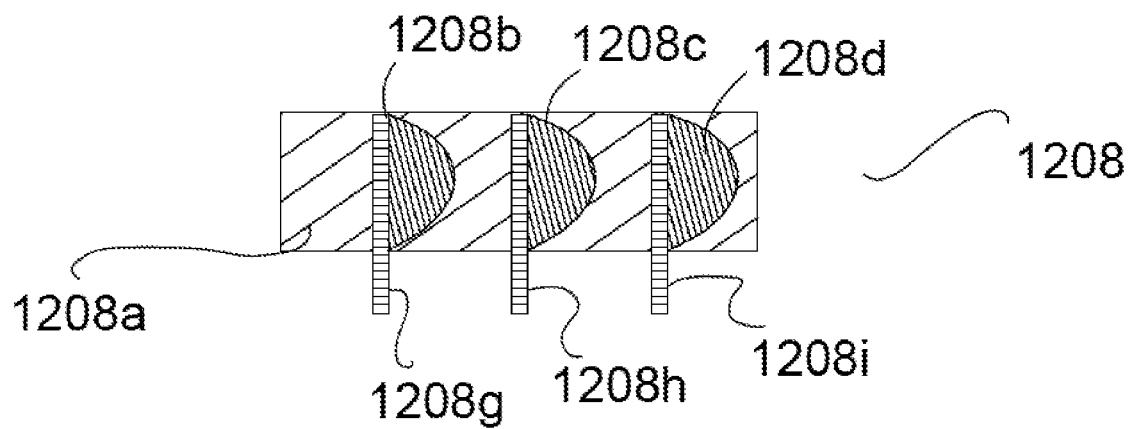
Figure 12G:
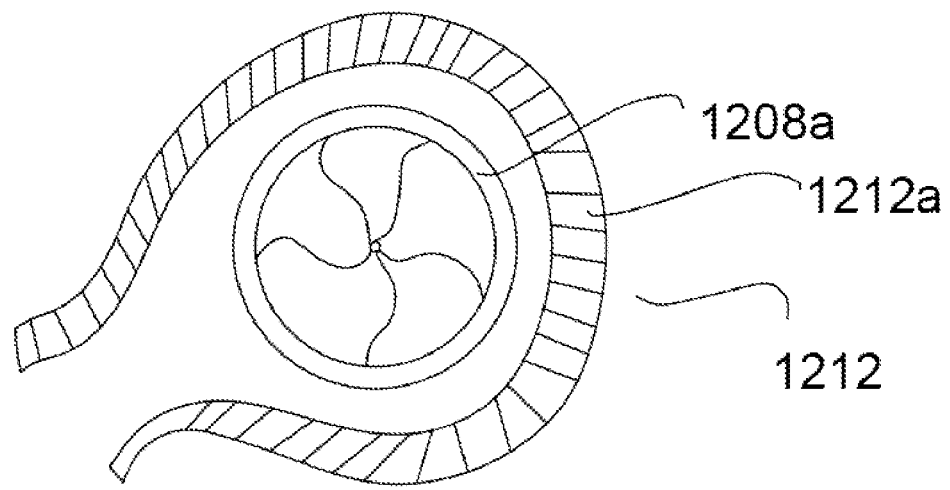
Figure 12H:
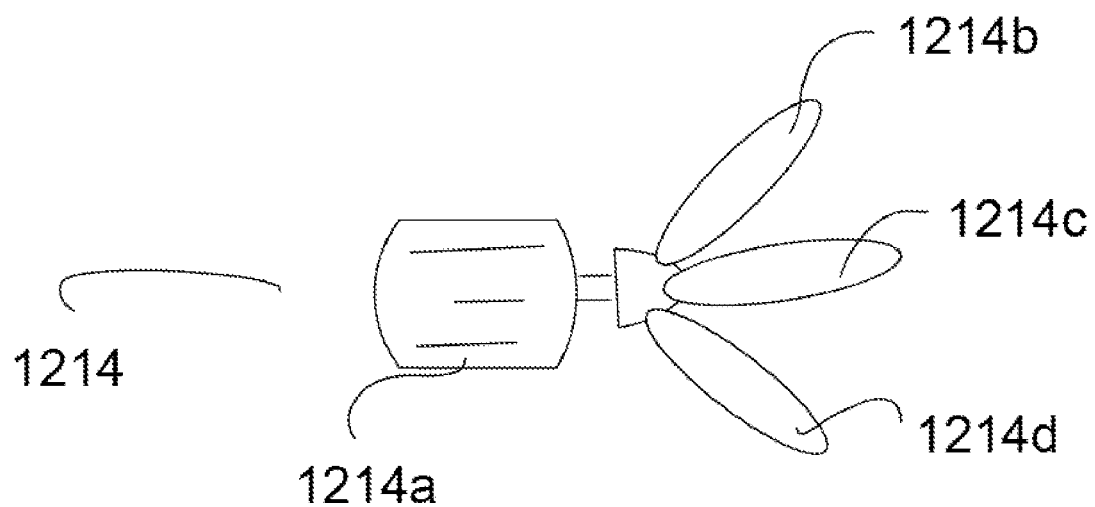
Figure 12I:
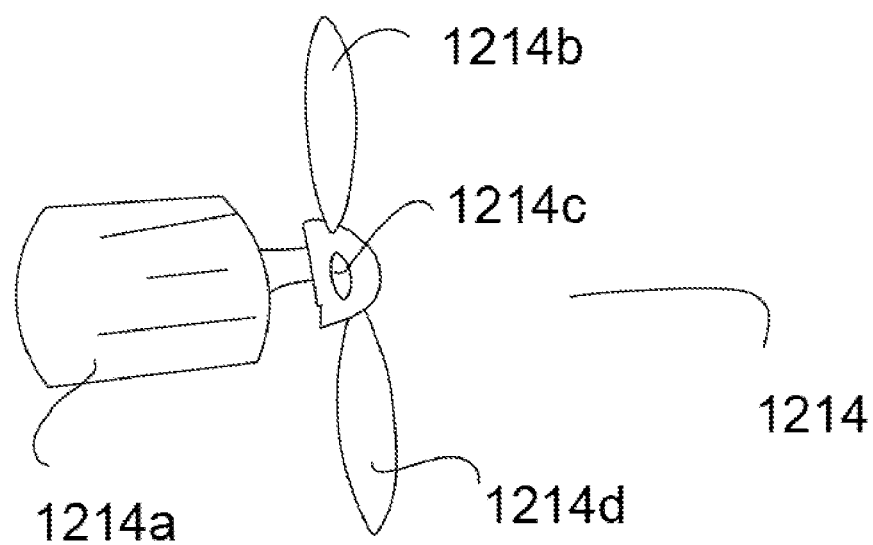
Figure 12J:
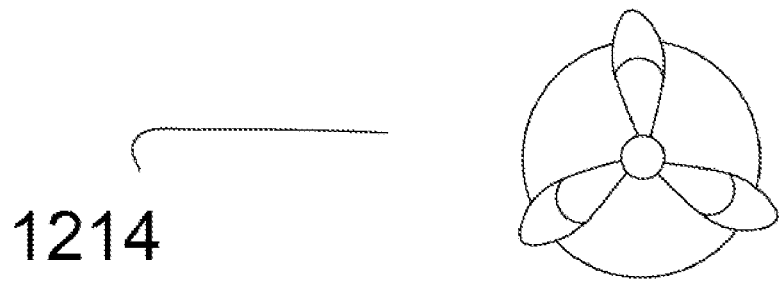
Figure 12K:
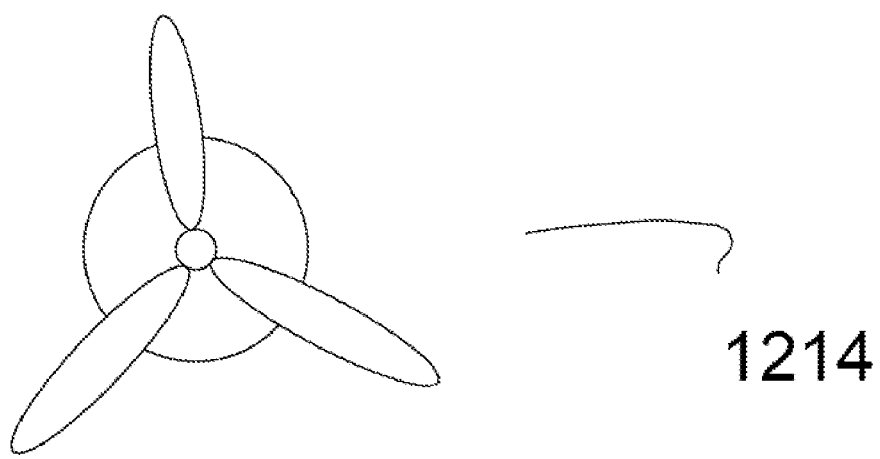
Figure 12L:
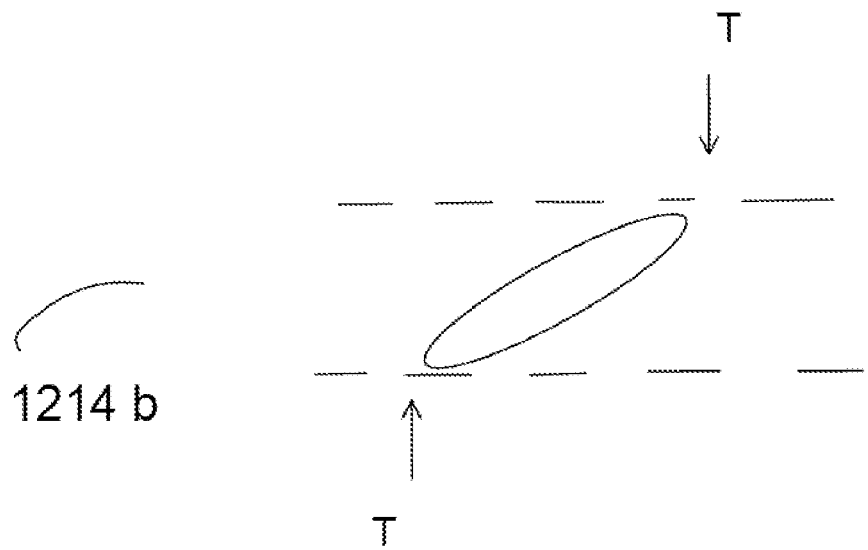
Figure 12M:
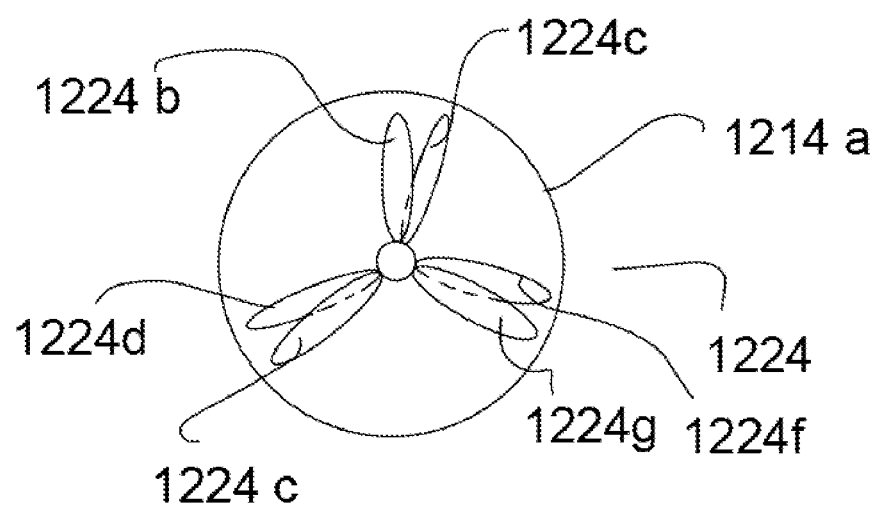
Figure 12N:
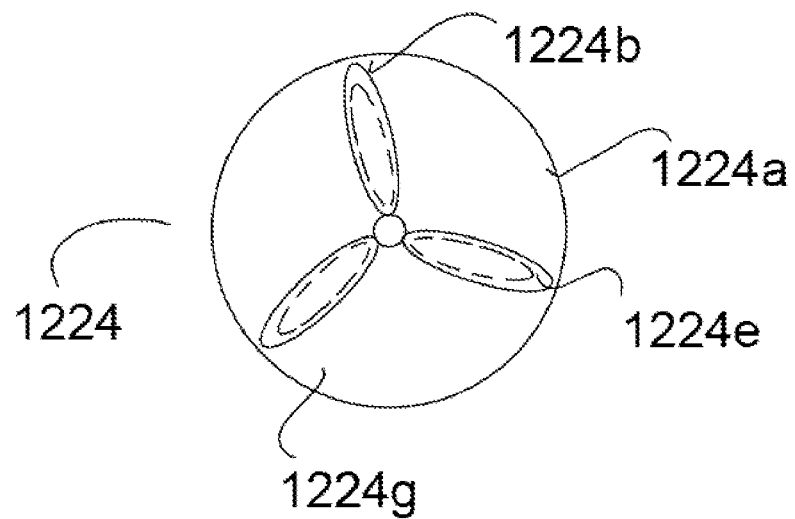
Figure 12O:
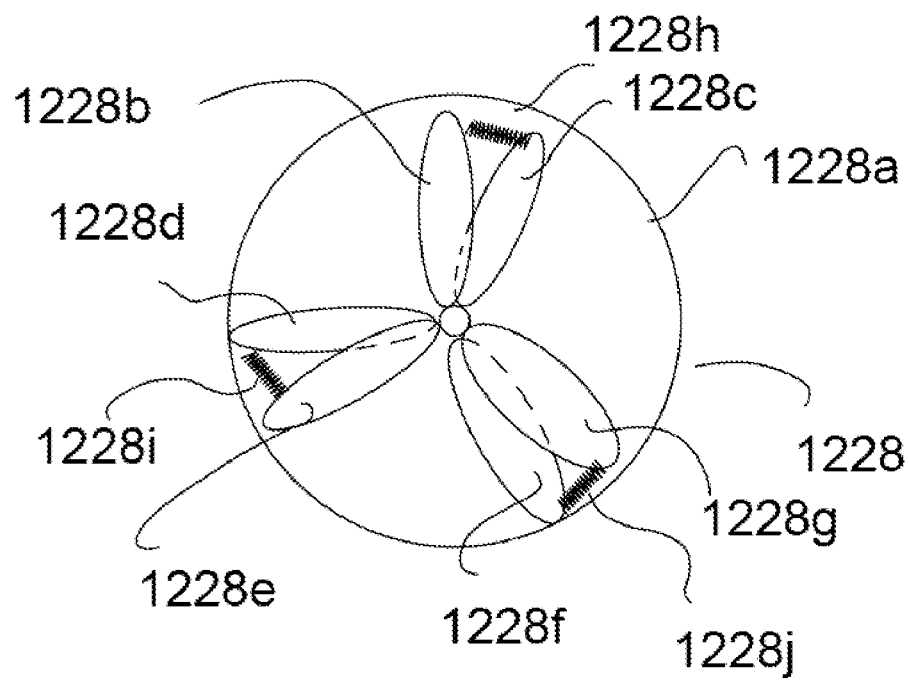
Figure 12P:
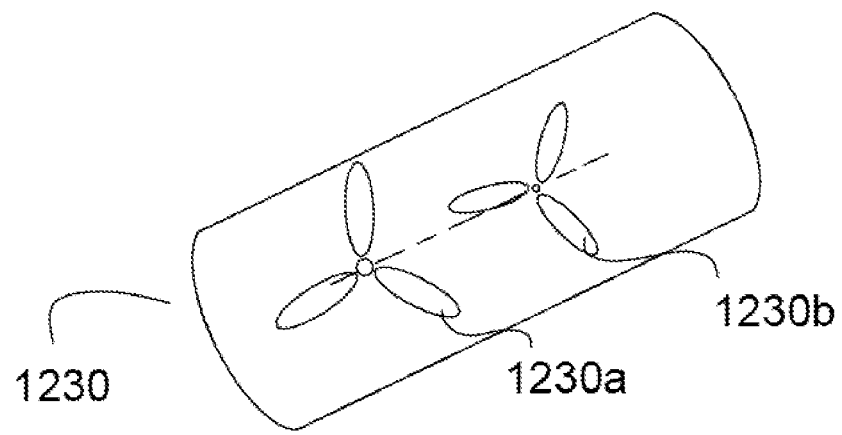
Figure 12Q:
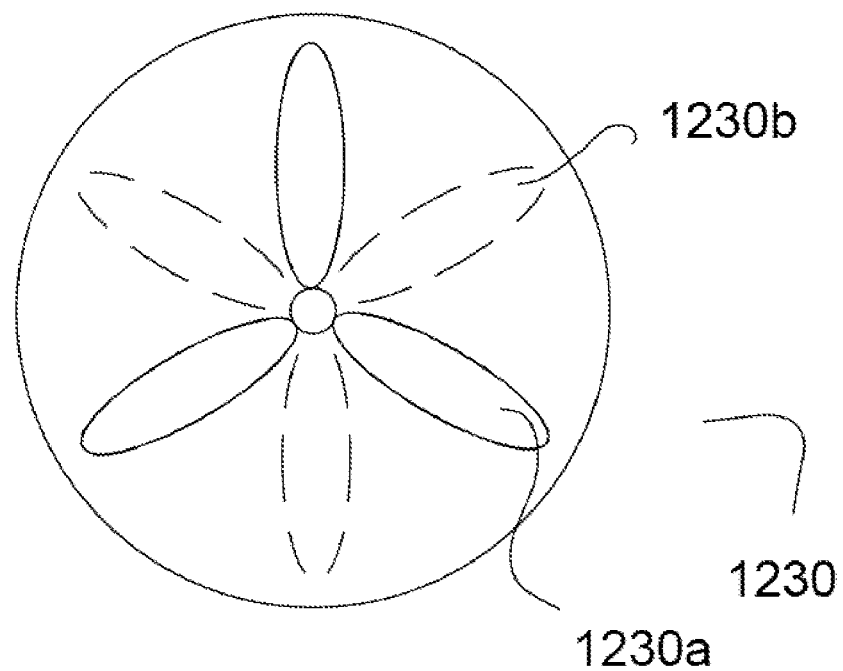
Figure 12R:
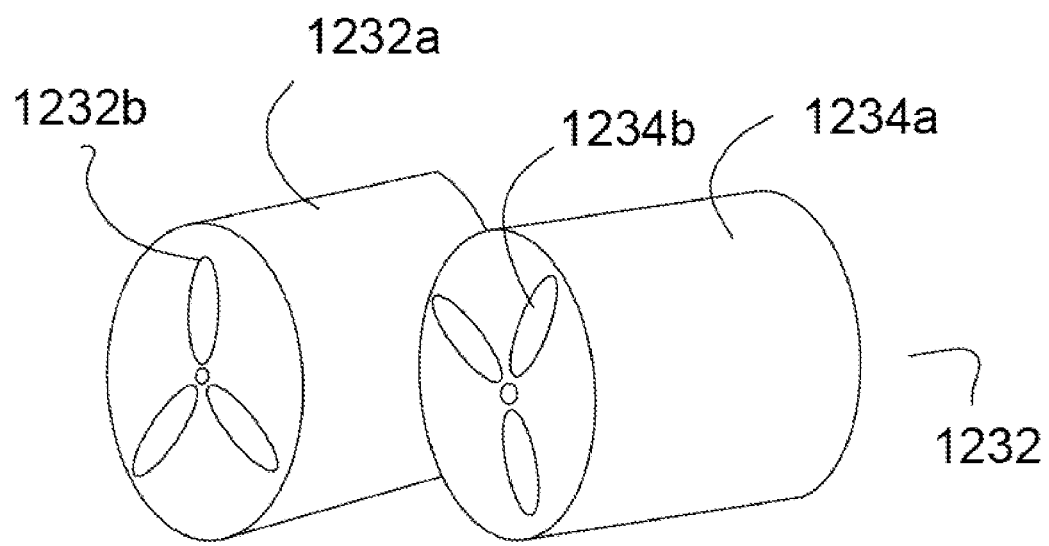
Figure 12S:
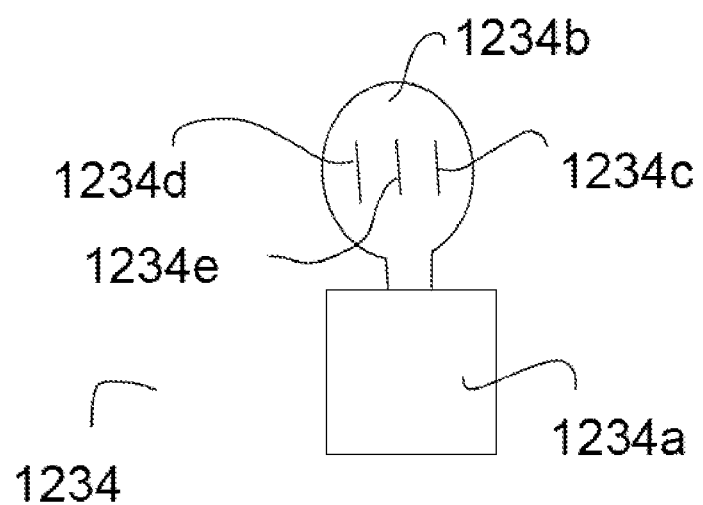

FIG. 12S to 12T-T illustrate embodiments of oscillatory speaker assemblies and components thereof.

Figure 12U:
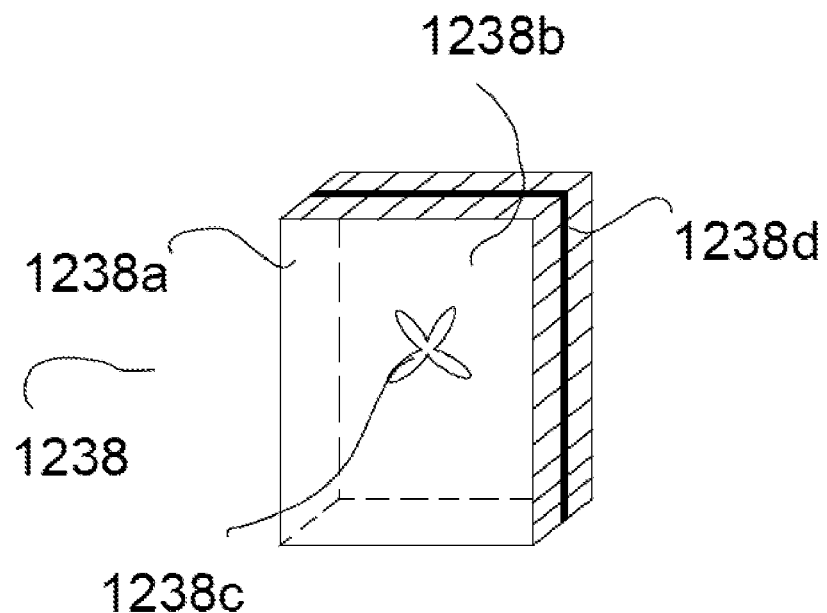
Figure 12V:
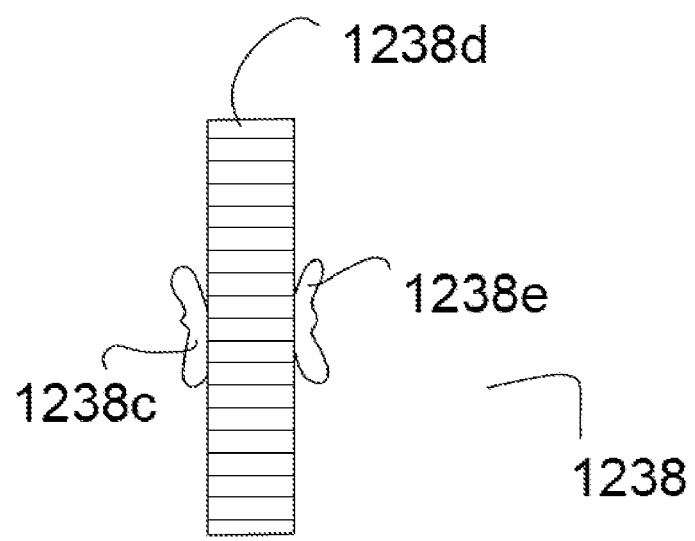

FIGS. 12U and 12V illustrate embodiments of a novel speaker assembly structure based on membrane structures in accordance with teachings of the present invention.

Figure 13:
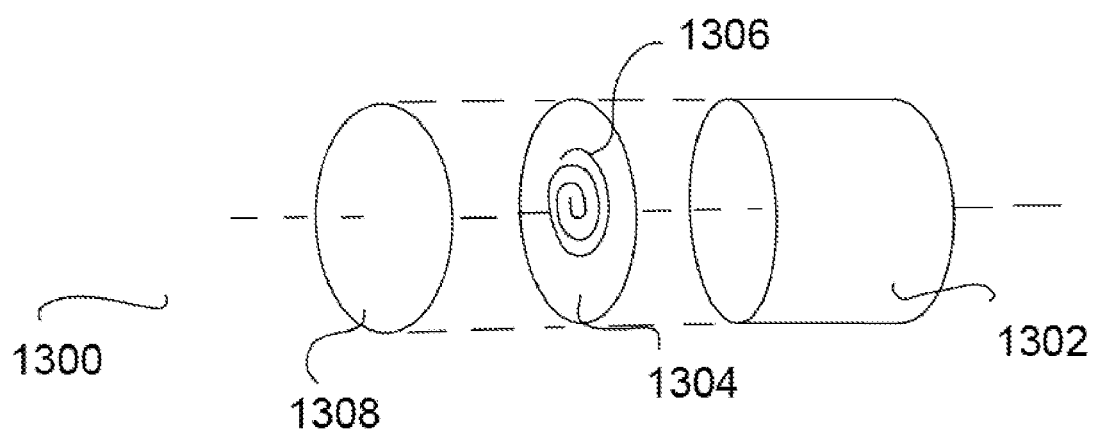

FIG. 13 illustrates an exemplary drum assembly incorporating one or more embodiments of the assemblies discussed elsewhere in the specification.

FIGS. 14A to 15C illustrate embodiments of speaker assembly components having a non-conductive filler material interspaced between conductive element(s).

DETAILED DESCRIPTION

The present invention provides assemblies for production of sound using a plurality of surfaces that may be fixed or moveable relative to each other. These surfaces may be electromagnetic, electrostatic, piezoelectric, transducer implemented, thermally activated, permanently magnetized, or activated by any other means, including but not limited to mechanical activation.

As explained in detail below, the surfaces may in a variety of configurations be free floating, constrained, levitated or combinations thereof. The surfaces themselves may be foldable, rollable, expandable, specialized or any combinations thereof.

Radial Speaker Assembly

Figure 1A:
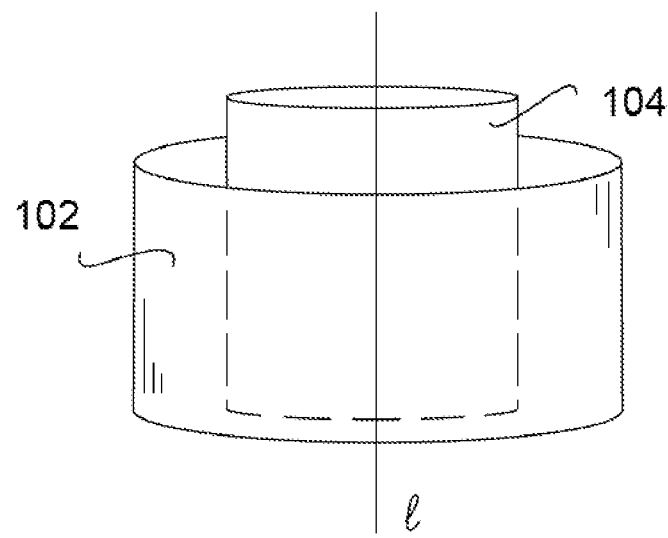
FIGS. 1A and 1B illustrate a radial speaker assembly.

In a first embodiment illustrated in FIG. 1A, the invention comprises a radially configured speaker assembly comprising a first cylindrical surface 102 having a first radius and a second cylindrical surface 104 having a second radius lesser than said first radius—wherein the first and second cylindrical surfaces are disposed coaxially about their longitudinal axis 1. Put differently, the first and second cylindrical surfaces are coaxially aligned about a common longitudinal axis such that the second cylindrical surface is nested within the second cylindrical surface. At least one of the first cylindrical surface and the second cylindrical surface is coupled with an electrostatic/electric field generating component, while the other of first cylindrical surface and the second cylindrical surface is coupled with one or more electrostatic/electric field sensitive components. Altering the electrostatic field generated by the electrostatic/electric field generating component results in movement by the electromagnetic/electric field sensitive component—resulting in relative movement between surfaces of the coaxially nested first and second cylindrical surfaces. In an embodiment of the invention, one of first cylindrical surface 102 and second cylindrical surface 104 is a diaphragm surface and the speaker assembly is configured such that altering the electrostatic field generated by the electrostatic field generating component results in radial expansion or radial contraction of the diaphragm—which in turn results in generation of sound.

In a first embodiment of the invention the diaphragm surface comprises the first cylindrical surface 102. In another embodiment of the invention the diaphragm surface comprises the second cylindrical surface 104.

Figure 1B:
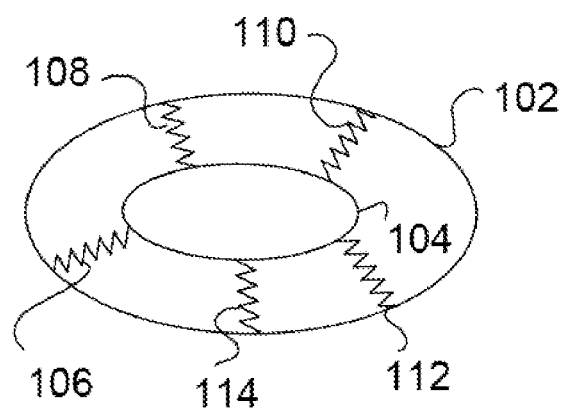

It would be understood that first cylindrical surface 102 and second cylindrical surface 104 may be affixed or held in place by any number of mechanisms. In one embodiment, first and second cylindrical surfaces are tethered to each other by the means of a plurality of resilient or elastic tethers. FIG. 1B illustrates a top view of first cylindrical surface 102 and second cylindrical surface 104, and the manner in which said surfaces are affixed to each other by a plurality of resilient tethers 106, 108, 110, 112 and 114. Said resilient tethers are selected and affixed such that first and second cylindrical surfaces 102 and 104 are affixed relative to each other in a manner that permits relative movement through expansion or contraction of one or both of said cylindrical surfaces. Additionally, the resilient characteristics of said tethers assists in said surfaces regaining their original configuration once an electrostatic field that is responsible for relative movement of said cylindrical surfaces has ceased to be applied. For the purposes of implementing the invention, it would further be understood that the first surface and second surface need not necessarily be entirely cylindrical, and may comprise of any similar or substantially similar 2D or 3D shapes.

Figure 1C:
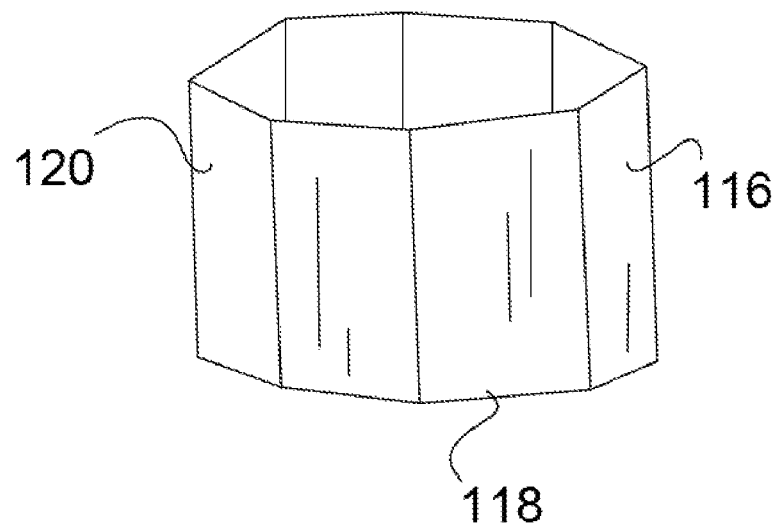
FIGS. 1C to 1H illustrate exemplary embodiments of diaphragms for speaker assemblies.
Figure 1D:
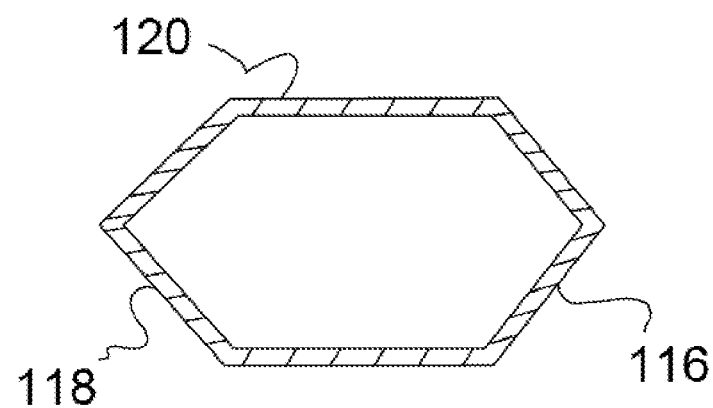

In an embodiment illustrated in FIG. 1C, any one (and in an embodiment, both) of the first cylindrical surface and the second cylindrical surface is a segmented surface consisting of a plurality of segments (e.g. 116, 118 and 120) joined together to form a substantially cylindrical surface or a polygonal surface. In an embodiment of the invention where the cylindrical surface in question is a diaphragm, the joining of segments to form the cylinder may be achieved by using one or more joints, folds, origami type connections or other fasteners that enable expansion and constriction of the diaphragm. FIG. 1D illustrates a top view of a jointed diaphragm structure. While the segments illustrated in FIG. 1C are substantially strip-shaped, it would be understood that any other regular or irregular shapes may be used for individual segments.

Figure 1E:
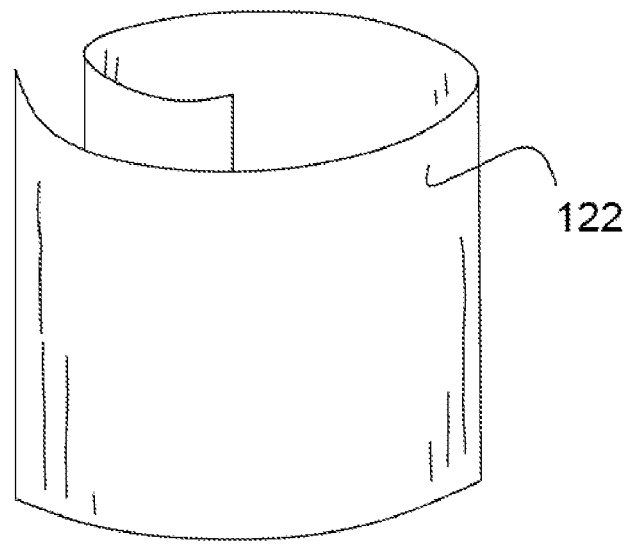
Figure 1F:
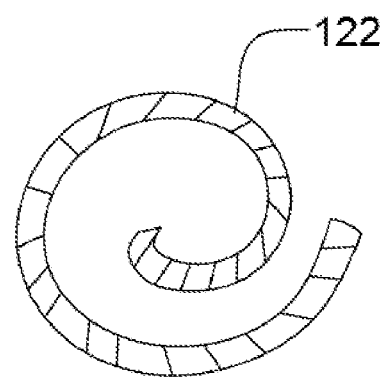

In another embodiment as illustrated in FIG. 1E, one or both of the first cylindrical surface and the second cylindrical surface may have a flexible spiral structure 122, such that the cylindrical surface is enabled to expand or contract by tightening or loosening of the spiral coil. FIG. 1F illustrates a top view of a cylindrical surface having a spiral structure 122. In an embodiment of the invention the spiral structure 122 comprises the speaker diaphragm. While FIG. 1E illustrates a spiral structure for a cylindrical surface, it would be understood that the first cylindrical surface and second cylindrical surface may equally comprise any other resiliently extensible or resiliently collapsible structure.

Figure 1G:
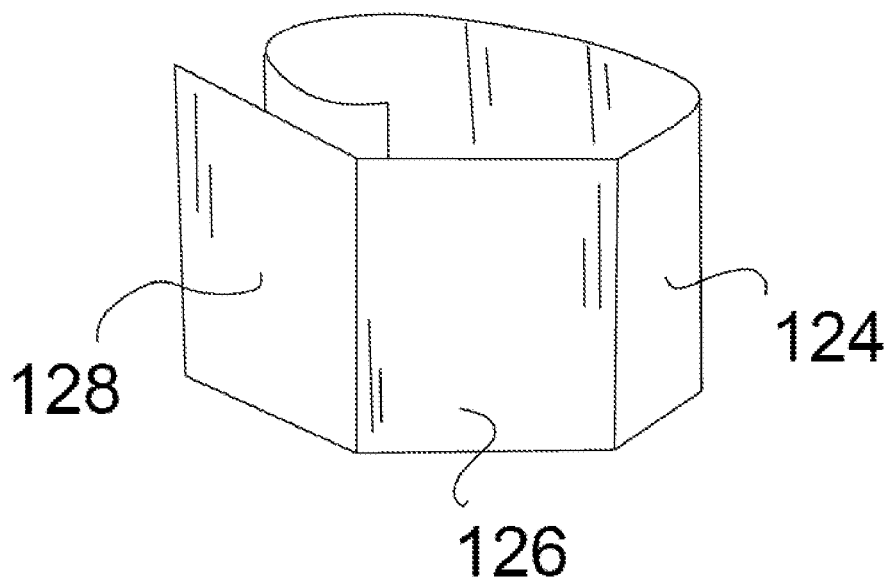
Figure 1H:
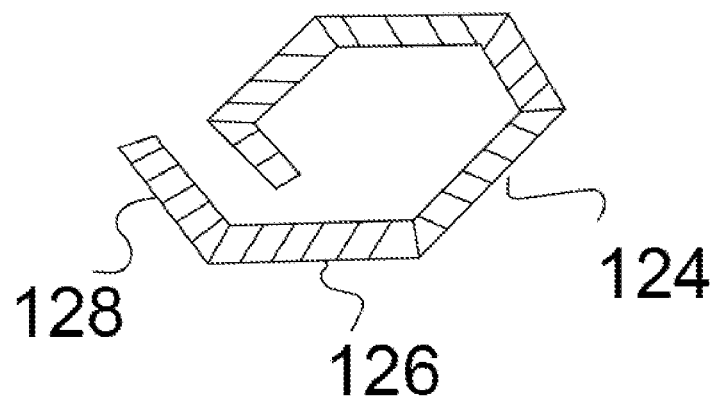

FIGS. 1G and 1H respectively illustrate side and top views of a cylindrical surface having a spiral configuration, while simultaneously comprising a plurality of joined segments 124, 126, 128.

Speaker Assembly Having Levitated or Suspended Surfaces

Figure 2A:
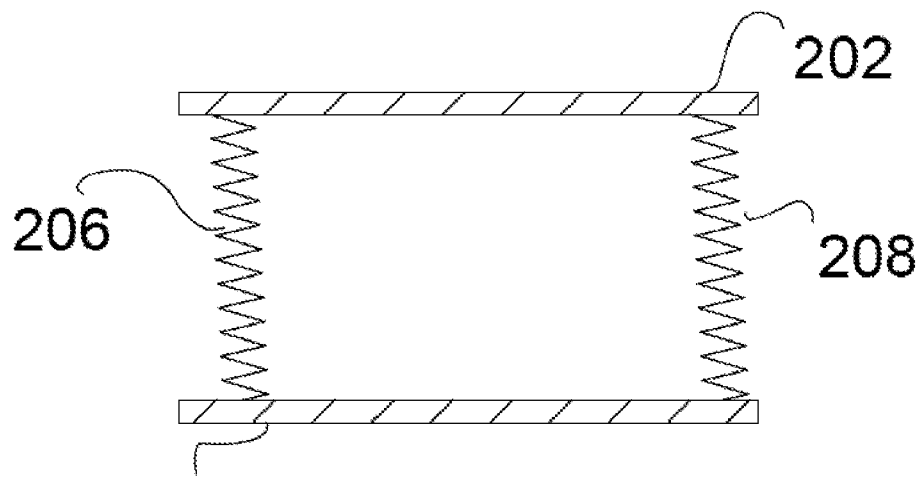
FIGS. 2A and 2B illustrate embodiments of tethered surfaces for speaker assemblies.
Figure 2B:
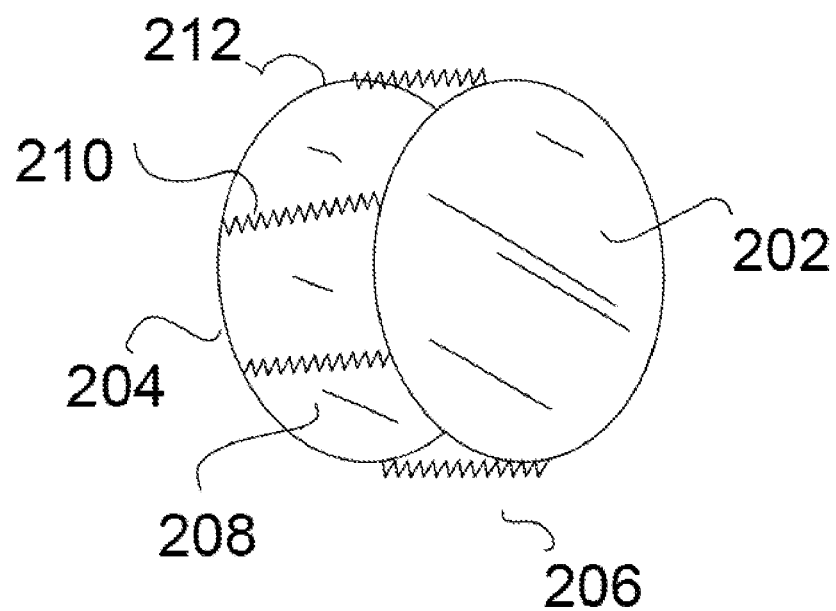

A second embodiment of the invention shown in FIGS. 2A and 2B, comprises a speaker assembly comprising a first surface 202 and a second surface 204—wherein the first and second surfaces are resiliently affixed to each other by a plurality of resilient fasteners 206 to 212. In an embodiment of the invention, said resilient fasteners may comprise resilient tethers or other fasteners 206 to 212, which in an excited phase permit relative movement between the two surfaces, and in a rest phase permit the two surfaces to resume their original position relative to each other. At least one of the first surface 202 and the second surface 204 is coupled with an electrostatic/electric field generating component, while the other of first surface 202 and the second surface 204 is coupled with one or more electrostatic/electric field sensitive components. In an excited phase, change in the electrostatic/electric field generated by the electrostatic/electric field generating component results in movement by the electrostatic/electric field sensitive component—resulting in relative movement between the two surfaces, while in a rest phase, the two surfaces resume their original position relative to each other. In an embodiment of the invention, one of first surface 202 and second surface 204 may be a diaphragm surface, and the speaker assembly is configured such that altering the electrostatic/electric field generated by the electrostatic/electric field generating component results in movement of the diaphragm—which in turn results in generation of sound.

The configuration described above may be used so as to tether, levitate or suspend the first and second surfaces 202 and 204 relative to each other—thereby obviating the need for a separate housing to affix said first and second surfaces relative to each other. In a preferred embodiment, the first and second surfaces are tethered to each other using two or more tethers arranged in an optimal configuration (which in an embodiment may comprise a total of three tethers arranged in a substantially triangular configuration).

It would be understood that in certain embodiments the first and second surfaces may be in a levitated arrangement inter se, for example using magnets, electric charges, or electric fields to ensure levitation of one surface with respect to the other. In such embodiments, the first and second surfaces may additionally be tethered to each other.

Spacer Based Speaker Assembly

Figure 3A:
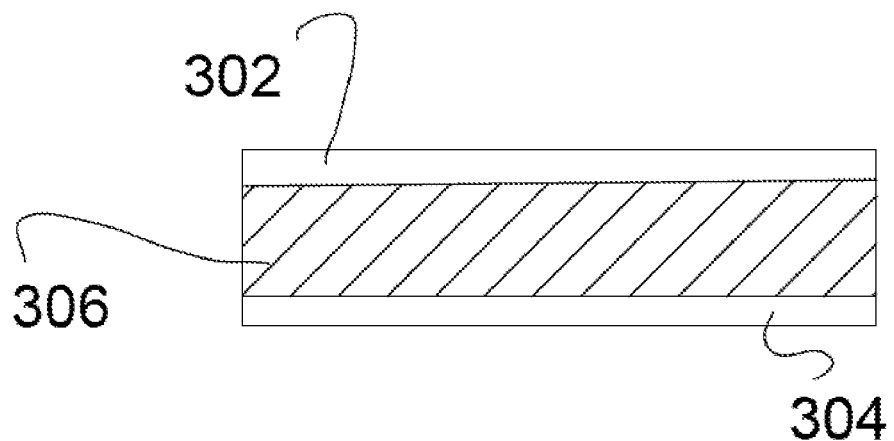
FIGS. 3A to 3D illustrate embodiments of spacer mounted surfaces for speaker assemblies.
Figure 3B:
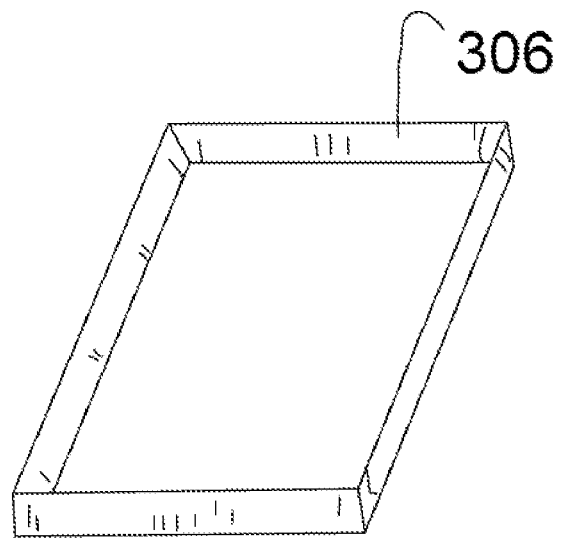
Figure 3C:
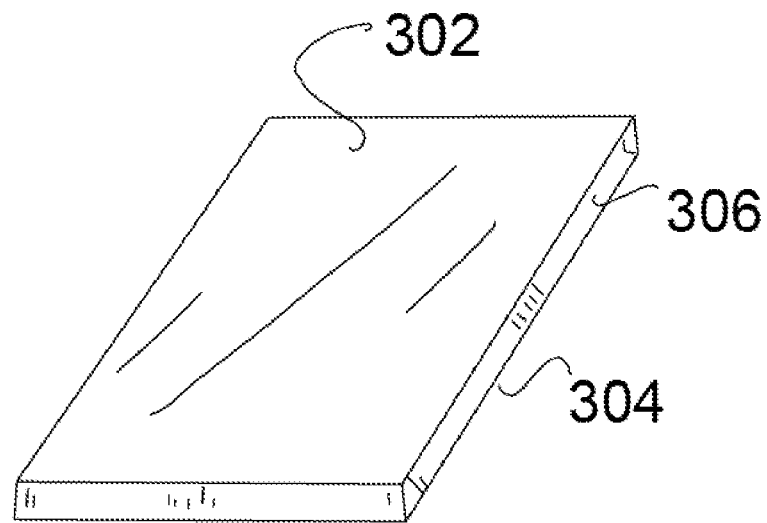
Figure 3D:
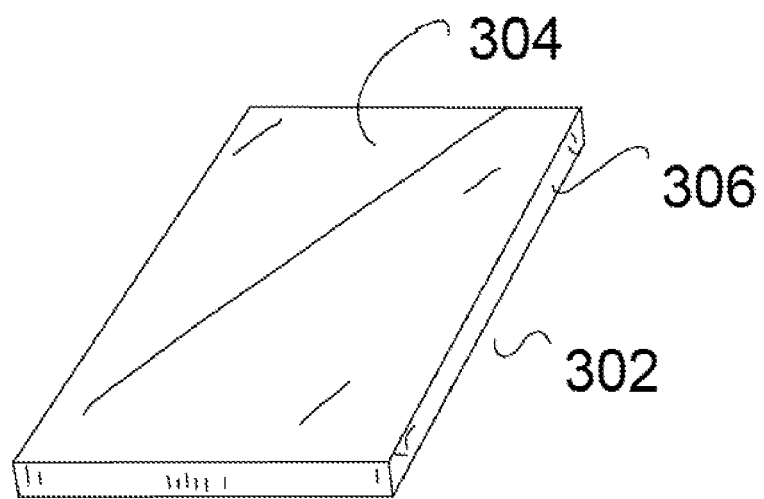

A third embodiment of the invention shown in FIGS. 3A and 3D, comprises a speaker assembly comprising a first surface 302 and a second surface 304—wherein the first and second surfaces are affixed inter se so as to enable movement relative to each other—using at least one spacer assembly 306. As illustrated in FIG. 3A, first surface 302 and second surface 304 may each be affixed on opposite sides of a spacer 306—which in an embodiment may be achieved by affixing each of first surface 302 and second surface 304 to spacer 306, or in another embodiment by stretching surfaces 302 and 304 over spacer 306 and thereafter affixing the edges of said two surfaces to each other. As illustrated in FIG. 3B, spacer 306 may comprise a spacer or frame structure that separates surfaces 302 and 304 from each other—thereby permitting relative movement therebetween. FIGS. 3C and 3D respectively illustrate perspective views of spacer 306 having surfaces 302 and 304 mounted thereon. In an excited phase, the mounting of said two surfaces 302 and 304 on spacer 306 permits relative movement between the two surfaces, and in a rest phase enables the two surfaces to resume their original position relative to each other. At least one of the first surface 302 and the second surface 304 may be coupled with an electrostatic/electric field generating component, while the other of first surface 302 and the second surface 304 is coupled with one or more electrostatic field sensitive components. In an excited phase, change in the electrostatic/electric field generated by the electrostatic/electric field generating component results in movement by the electrostatic/electric field sensitive component—resulting in relative movement between the two surfaces, while in a rest phase, the two surfaces resume their original position relative to each other. In an embodiment of the invention, one of first surface 302 and second surface 304 may be a diaphragm surface and the speaker assembly is configured such that altering the electrostatic/electric field generated by the magnetic/electric field generating component results in movement of the diaphragm—which in turn results in generation of sound.

The configuration described above may be used to mount the first and second surfaces 302 and 304 relative to each other—thereby obviating the need for a separate external housing to affix said first and second surfaces relative to each other. In an embodiment, affixing the first and second surfaces 302, 304 to spacer 306 creates a sealed compartment between said first and second surfaces, which compartment may in various embodiments contain pressurized gas, partial vacuum, or gas (e.g. air) at normal atmospheric pressure.

The spacer of the present invention may comprise any spacer frame that permits for a first surface and a second surface to be mounted thereon in an opposed or substantially opposed configuration, such that said first and second surfaces are separated by a defined separation distance. While the spacer illustrated in FIGS. 3B to 3D is a substantially rectangular frame shape, it would be understood that any other spacer shape is equally conceivable, including without limitation a circular frame shape, a triangular frame shape or any other regular or irregular polygon frame shape.

Figure 3E:
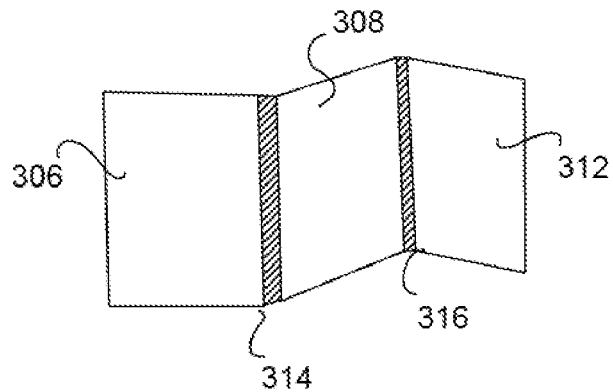
FIG. 3E to 3G illustrate embodiments of foldable or rollable speaker assemblies.
Figure 3F:
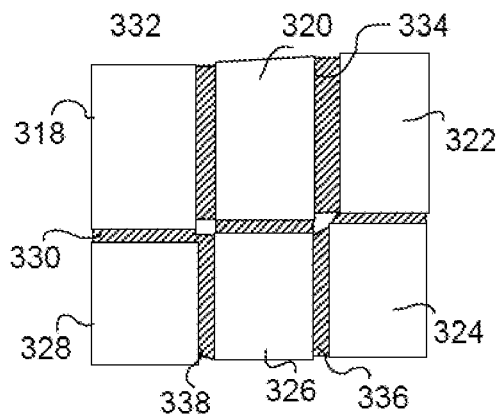
Figure 3G:
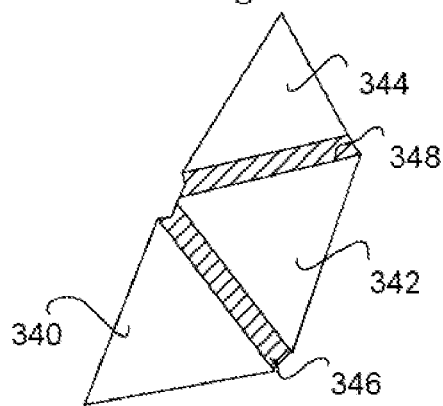

In a specific embodiment of the invention, a plurality of spacer based speaker assemblies of the kind discussed above may be flexibly interconnected to form a larger speaker assembly. Illustrative embodiments of such configurations are provided in FIGS. 3E to 3G. In the embodiment of FIG. 3E, rectangular assemblies 306, 308, 312 are assembled into a larger linearly constructed assembly through joints or fasteners 314 and 316. In the embodiment of FIG. 3F, rectangular speaker assemblies 318, 320, 322, 324, 326, 328 are assembled through joints or fasteners 330, 332, 334, 336, 338 into a larger rectangular speaker configuration. In the embodiment illustrated in FIG. 3G, triangular speaker assemblies 340, 342, 344 are linearly assembled through joints 346, 348 to form a larger irregularly shaped speaker assembly. It would be understood that assembling multiple speaker assemblies using joints or fasteners (and in an embodiment resilient or flexible fasteners) results in strain relief when the speaker assemblies are assembled into a larger configuration, and additionally ensures that such larger configuration is foldable or rollable.

External Constraint Based Speaker Assembly

Figure 4A:
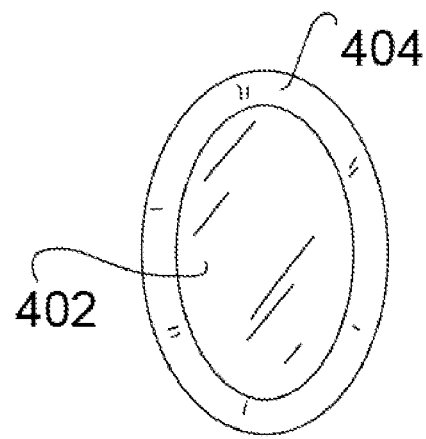
FIGS. 4A to 4C illustrate embodiments of tension adjustable speaker assemblies.
Figure 4B:
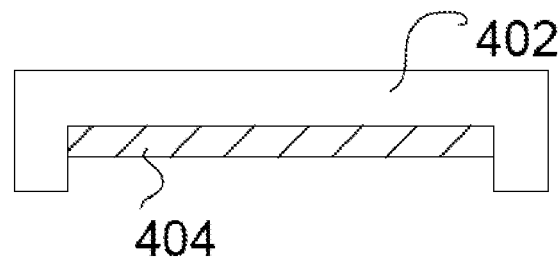
Figure 4C:
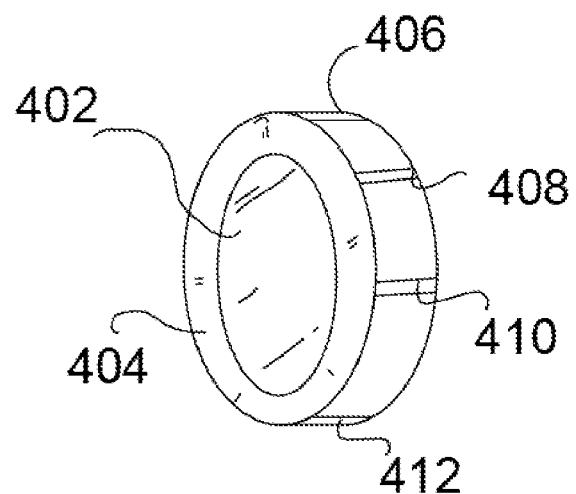

In an alternative embodiment of the invention, illustrated in FIGS. 4A to 4C, a speaker assembly comprises a surface 402 mounted on an external constraint such as a mounting ring 404, and optionally provided with one or more tension adjusters (for example tensioning rods 406, 408, 410, 412), configured to enable alteration of the tension of surface 402. In an embodiment, surface 402 may be opposed to a second surface (not shown). In an excited phase, mounting of surface 402 on ring 404 enables relative movement between surface 402 and said opposed second surface, and in a rest phase enables the two surfaces to resume their original position relative to each other. At least one of surface 402 and the opposed second surface may be coupled with an electrostatic/electric field generating component, while the other of surface 402 and the second surface may be coupled with one or more electrostatic field sensitive components. In an excited phase, change in the electrostatic/electric field generated by the electrostatic/electric field generating component results in movement by the electrostatic/electric field sensitive component—resulting in relative movement between the two surfaces, while in a rest phase, the two surfaces resume their original position relative to each other. In an embodiment of the invention, surface 402 may be a diaphragm surface and the speaker assembly is configured such that altering the electrostatic field generated by the magnetic/electric field generating component results in movement of the diaphragm—which in turn results in generation of sound.

Extensible Diaphragm Based Speaker Assembly

Figure 5A:
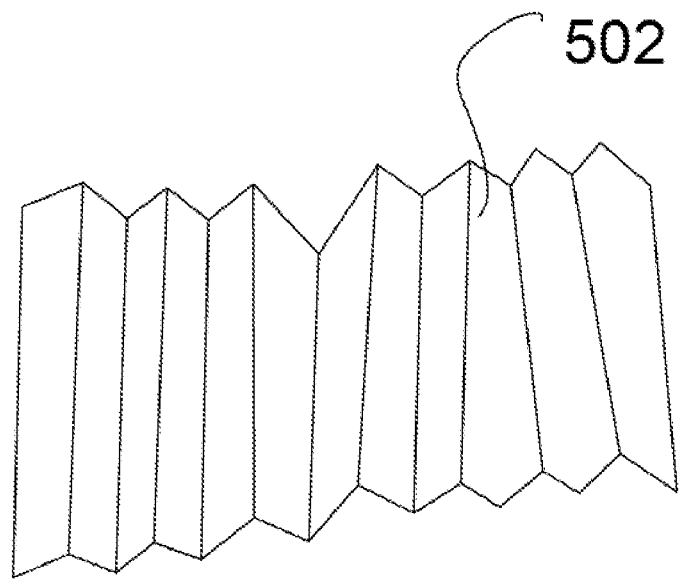
FIGS. 5A and 5B illustrate extensible diaphragms for speaker assemblies.
Figure 5B:
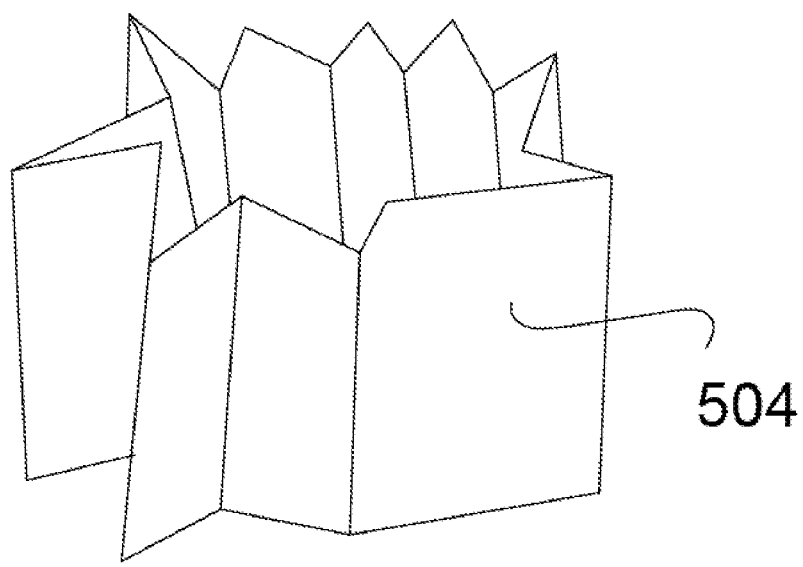

In an embodiment of the invention, the diaphragm of the speaker assembly may have an extensible structure—for example, the folded or pleated structure illustrated in FIG. 5A or 5B. FIG. 5A illustrates a diaphragm 502 of the flat type/sheet type, while FIG. 5B illustrates a diaphragm 502 of the type that may be implemented in the radial speaker assembly embodiments discussed above. By implementing the extensible (e.g. pleated) surface structure for the diaphragm, it has been found that said diaphragm is capable of moving more air than a non-extensible diaphragm of substantially the same dimensions.

Speaker Assembly Having Magnetized Diaphragm Surface

Prior art solutions have typically involved the use of fixed permanent magnets and moving electromagnets. The present invention seeks to generate sound through speaker assemblies involving moving permanent magnets and fixed or moving electromagnets.

The invention achieves this by one or more of the following novel speaker assembly configurations.

Figure 6A:
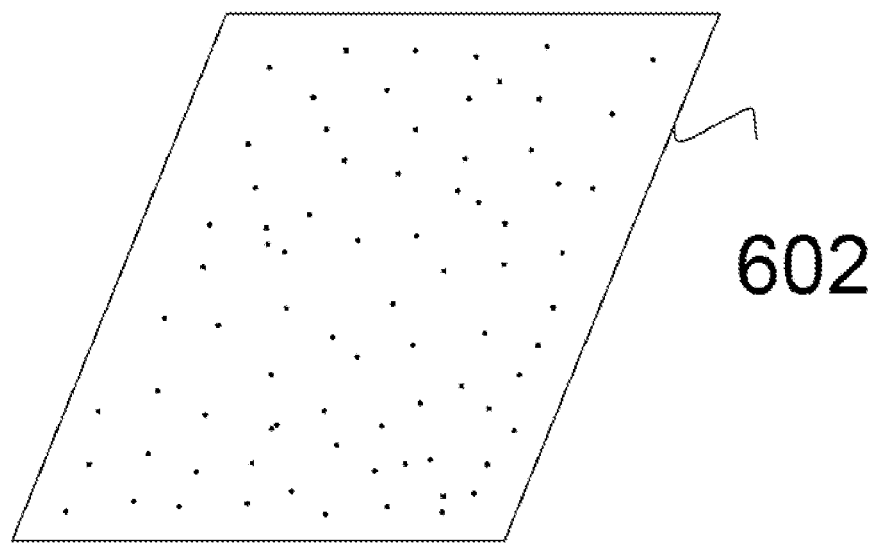
FIGS. 6A and 6B illustrate diaphragms for speaker assemblies having magnetic or charge sensitive particles provided thereon.

In a first embodiment of the invention illustrated in FIG. 6A, the moving permanent magnet takes the form of a moving speaker surface (for example the diaphragm surface) that is magnetized. This can be achieved in many different ways including but not limited to coating the diaphragm surface with magnetic or magnetically sensitive particles and/or layers, embedding said diaphragm surface with magnetic or magnetically sensitive particles and/or layers, and deposition of magnetic or magnetically sensitive particles on the diaphragm surface using additive printing.

FIG. 6A illustrates a diaphragm surface 602 that has a coating of charged particles deposited thereon. By coating said surface with magnetic or magnetically sensitive particles or with an electrically conductive structure, said surface 602 has been configured to be magnetically sensitive or conductive, such that said surface would respond to changes in magnetic fields/electrostatic fields generated by one or more fixed or moving electromagnets, or in an alternate embodiment can be used to generate a magnetic/electrostatic field by applying an electric current through the electrically conductive structure. By using a coating of magnetized or magnetically sensitive particles or by applying the electrically conductive structure on diaphragm surface 602, the assembly avoids the requirement for bulky magnets, and enables adoption of a variety of thin form factor configurations for the speaker assembly. In addition to applying magnetic or magnetically sensitive particles or an electrically conductive structure to the diaphragm through application of coatings, magnetic or magnetically sensitive particles or the electrically conductive structure may additionally be embedded onto a diaphragm surface by subtractive treatments comprising etching of a metal sheet affixed onto a substrate, or by additive treatments comprising deposition of magnetic or magnetically sensitive particles or an electrically conductive structure in predefined patterns onto a substrate.

Figure 6B:
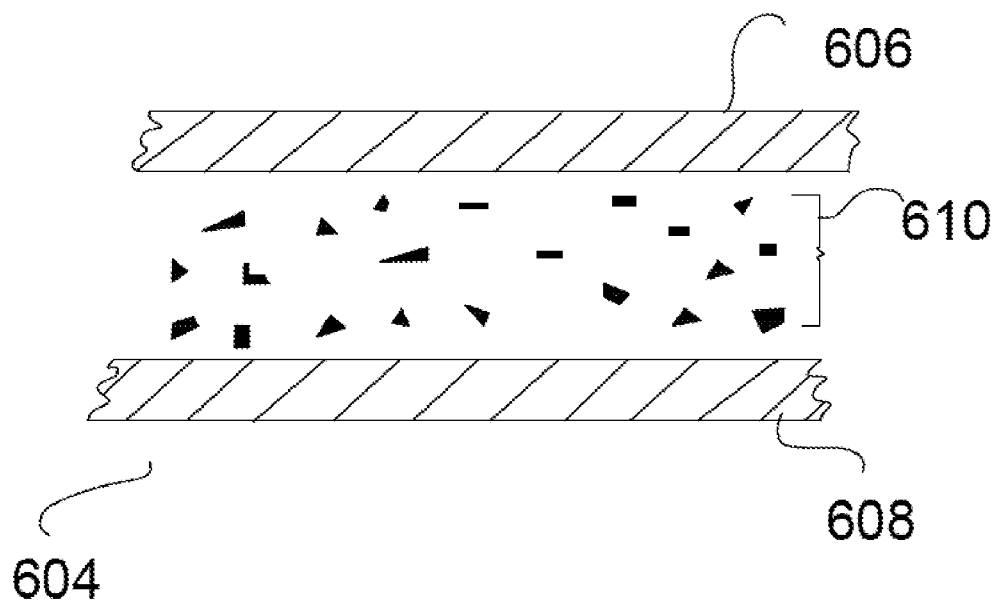

In a particularly advantageous embodiment, illustrated in FIG. 6B, diaphragm 604 is formed by sandwiching a layer 610 of magnetic or magnetically sensitive elements, or particles or coatings, or an electrically conductive structure between a first substrate 606 and a second substrate 608. It would be appreciated that adopting this configuration significantly reduces removal or shedding of magnetic or magnetically sensitive elements, particles or coatings, or part or whole of the electrically conductive structure from an outer layer of the diaphragm due to movement, impact or ordinary wear and tear.

In affixing magnetic or magnetically sensitive particles or an electrically conductive structure to a substrate, any one or more of mechanical, thermal or chemical means may be used. It would be understood that the teachings of all of the above embodiments regarding application of charged particles or magnetically sensitive particles to a moving surface may equally be applied for the purposes of affixing one or more conductive elements to a moving surface within speaker assemblies.

Speaker Assembly Having Electrically Conductive Structure

Figure 7A:
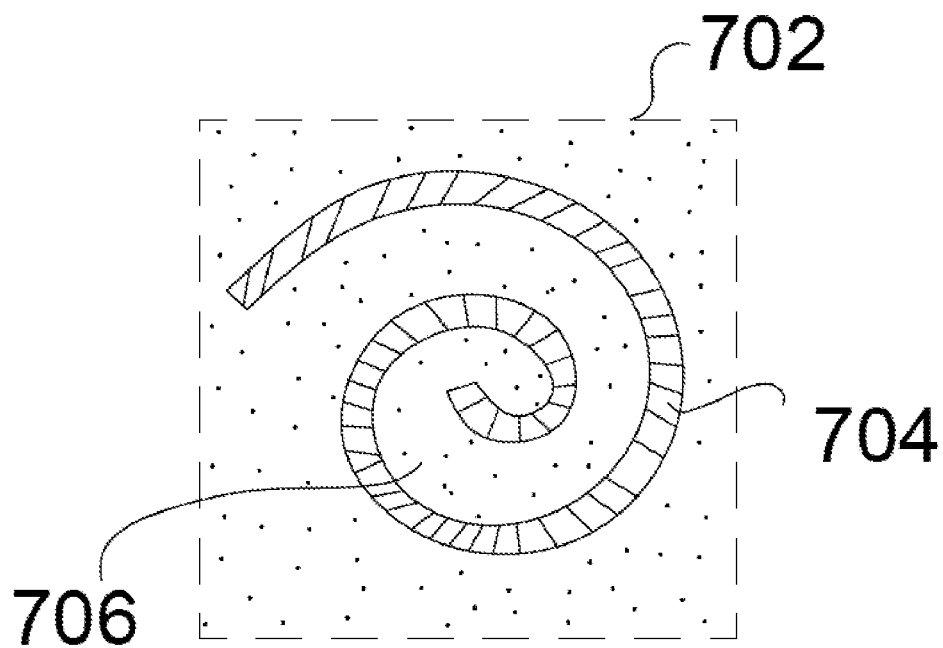
FIGS. 7A and 7B illustrate embodiments of a diaphragm surface comprising an electrically conductive structure.

In an embodiment of the invention illustrated in FIG. 7A, a moving surface or diaphragm 702 of the speaker assembly may comprise an electrically conductive structure 704 capable of generating an electrostatic field in response to application of an electric field across said electrically conductive structure—wherein one or more interspaces between the electrically conductive structure are filled using a non-conductive filler material 706, and in an embodiment the filler material is present strictly within the grid structure and there is no overlap between the grid structure and the filler material. By selecting an appropriate filler material, diaphragm 702 may have appropriate flexible or resilient properties necessary for it to serve as a moving surface within a speaker assembly. In another embodiment, the filler material may overlap with the grid structure.

Figure 7B:
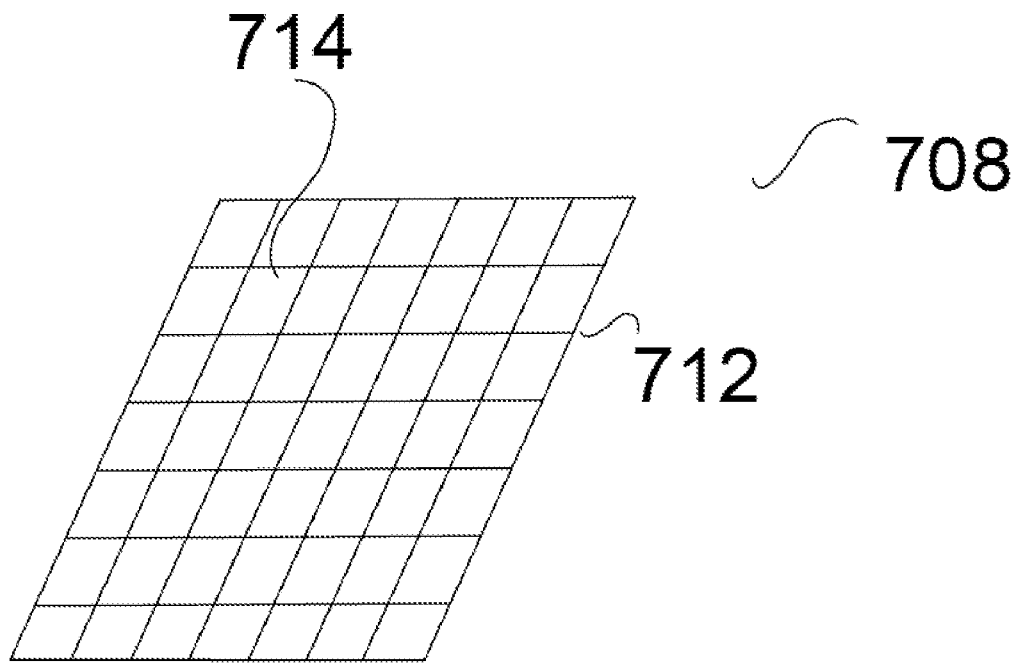

In an embodiment of the invention illustrated in FIG. 7B, a moving surface or diaphragm 708 of the speaker assembly may comprise an electrically conductive grid or mesh structure 712 having interspaces 714 between the electrically conductive elements of the grid. By ensuring that the area of the interspaces is sufficiently small, it has been found that the electrically conductive grid or mesh structure 712 performs satisfactorily as a diaphragm to generate sound within the speaker assembly. It has been found that by eliminating membrane material surrounding the conductive material, field strength of the electrostatic field generated by the diaphragm is stronger, while simultaneously reducing the weight and thickness of the diaphragm—resulting in lower weight, lower required signal power, lower design/manufacturing complexity, lower cost, increased efficiency, sensitivity, fidelity and thinner and more number of form factors.

Figure 14A:
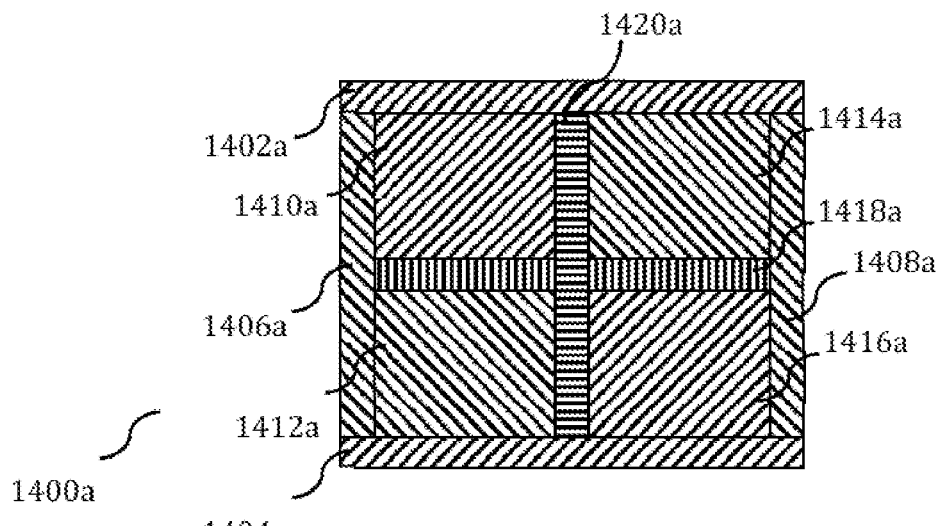
Figure 14B:
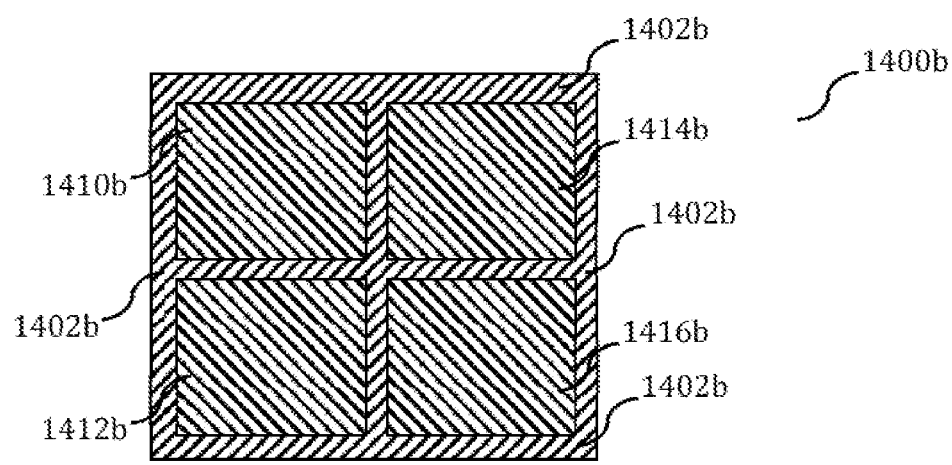
Figure 14C:
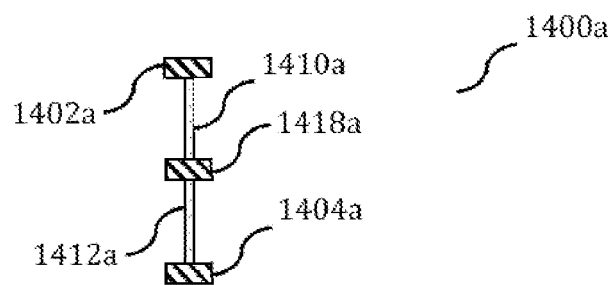

FIGS. 14A and 14C illustrate two cross-sectional views (that are perpendicular to each other) of a speaker assembly having a conductive mesh structure with having non-electrically conductive filler material interspaced between conductive elements of said mesh structure, wherein an external periphery of filler material within each interspace is separated from an external periphery of filler material within at least one adjacent interspace.

As shown in FIGS. 14A and 14C, in the speaker assembly 1400a, a conductive mesh structure may be formed by conductive elements or members 1402a, 1404a, 1406a, 1408a, 1418a, 1420a arranged in a mesh or grid structure, and having non-electrically conductive filler material 1410a, 1412a, 1414a, 1416a interspaced between the conductive elements or members 1402a, 1404a, 1406a, 1408a, 1418a. As will be observed from the FIGS. 14A and 14C, the conductive elements or members 1418a and 1420a form separators that ensure that an external periphery of filler material 1410a, 1412a, 1414a, 1416a that is provided within the interspaces formed between conductive elements or members 1402a, 1404a, 1406a, 1408a, 1418a, 1420a is separated from an external periphery of filler material 1410a, 1412a, 1414a, 1416a in their adjacent insterspaces.

FIG. 14B shows another embodiment of the speaker assembly 1400b, wherein a conductive mesh structure is formed by a unitary grid shaped conductive element or member 1402b, and having non-electrically conductive filler material 1410b, 1412b, 1414b, 1416b interspaced within the grid or mesh structure formed by conductive element 1402b. As will be observed from the FIG. 14B, the grid shape of the conductive element or member 1402b forms separators that ensure that an external periphery of filler material 1410b, 1412b, 1414b, 1416b that is provided within the interspaces formed between the grid or mesh structure formed by conductive element or member 1402b is separated from an external periphery of filler material 1410b, 1412b, 1414b, 1416b in their adjacent insterspaces.

Figure 14D:
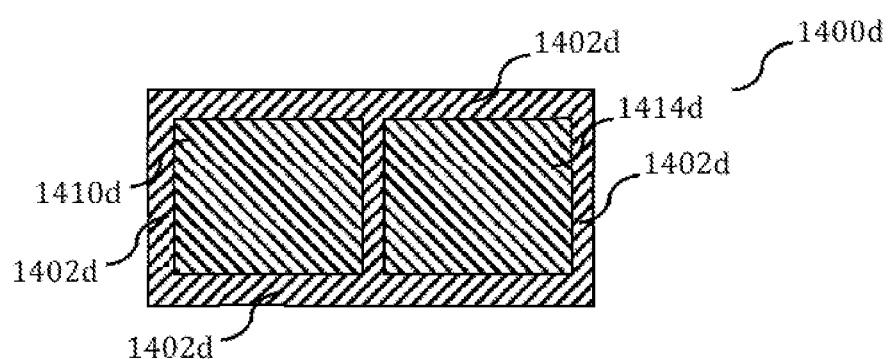

FIG. 14D shows another embodiment of the speaker assembly 1400d, wherein a conductive mesh structure is formed by a unitary grid shaped conductive element or member 1402d, and having non-electrically conductive filler material 1410d, 1414d interspaced within the grid or mesh structure formed by conductive element 1402d. As will be observed from the FIG. 14D, the grid shape of the conductive element or member 1402d forms separators that ensure that an external periphery of filler material 1410d, 1414d that is provided within the interspaces formed between the grid or mesh structure formed by conductive element or member 1402d is separated from an external periphery of filler material 1410d, 1414d in their adjacent insterspaces.

Figure 15A:
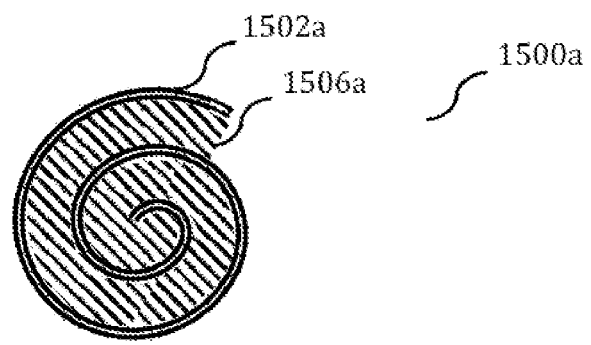
Figure 15B:
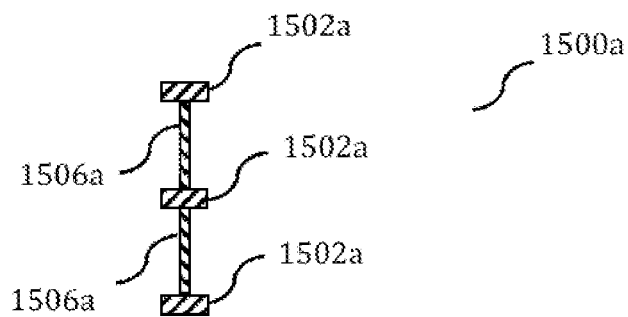

FIGS. 15A and 15B illustrate two cross-sectional views (that are perpendicular to each other) of a speaker assembly 1500a having a conductive structure that is formed by a spiral conductive element, having non-electrically conductive filler material 1506a interspaced between adjacent walls 1502a of the spiral conductive element, wherein an external periphery of filler material 1506a within an interspace formed by two adjacent walls 1502a of the spiral conductive element is separated from an external periphery of filler material 1506a within at least one adjacent interspace formed by the next two adjacent walls 1502a of the spiral conductive element.

Figure 15C:
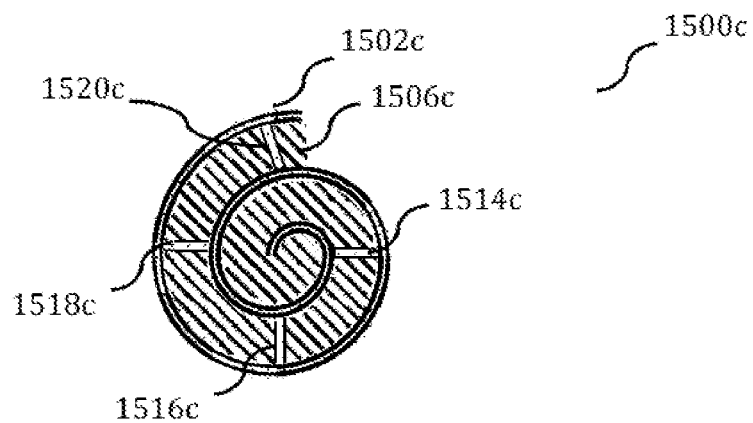

FIG. 15C illustrates a cross-sectional view of another embodiment of a speaker assembly 1500c having a conductive structure that is formed by a spiral conductive element, having non-electrically conductive filler material 1506a interspaced between adjacent walls 1502c of the spiral conductive element, and additionally having separators or spacers 1514c, 1516c, 1518c, 1520c, disposed within the interspace formed by adjacent walls 1502c of the spiral conductive element. As shown in FIG. 15C, an external periphery of filler material 1506c within each interspace defined by two adjacent walls 1502c of the spiral conductive element and two adjacently positioned spacers 1514c, 1516c, 1518c, 1520c is separated from an external periphery of filler material 1506c within at least one adjacent interspace defined by two adjacent walls 1502c of the spiral conductive element and two adjacently positioned spacers 1514c, 1516c, 1518c, 1520c.

It has also been found that the acoustic response in all of the above embodiments of the speaker assembly is highly tunable—including through configuring one or more of structure, field strength, pattern/distribution of magnetic or magnetically sensitive components or electrically conductive elements, conductor size, number of turns of the conductor, current, spacing charged particle size, magnetization, coercivity etc. The invention additionally permits for varying acoustic characteristics based on shape, size, thickness variability, material, tension, suspension etc.

Speaker Assemblies Having Configurable Conductor Shapes

It has been found that using additive (deposition based) or subtractive (etching based) manufacturing methods for embedding a conductive structure within a diaphragm or surface of the speaker assembly presents several advantages, including enabling manufacture of substantially thin diaphragms or surfaces, and additionally enabling manufacture of conductive structures of any desired shape or size.

FIGS. 8A to 8G illustrate exemplary embodiments of diaphragms 802 to 814 that may be produced in accordance with teachings of the invention. Diaphragm 802 comprises diaphragm surface 802a having a single annular spiral shaped conductive structure 802b provided thereon. Diaphragm 804 comprises diaphragm surface 804a having a single rectangular spiral shaped conductive structure 804b provided thereon. Diaphragm 806 comprises triangular diaphragm surface 806a having a single triangular spiral shaped conductive structure 806b provided thereon. Diaphragm 808 comprises diaphragm surface 808a having a substantially e-shaped conductive structure 808b provided thereon. Diaphragm 810 comprises diaphragm surface 810a having a zig-zag shaped conductive structure 810b provided thereon. Diaphragm 812 comprises diaphragm surface 812a having multiple spiral shaped conductive structures 812b to 812f provided thereon. Diaphragm 814 comprises diaphragm surface 814a having provided thereon, a first spiral shaped conductive structure 814b and a second spiral shaped conductive structure 814c disposed within the first spiral shaped conductive structure 814b. It would be understood that by varying the shape and size of the conductive structures deposited on or embedded within the diaphragm, the invention enables configuring the diaphragm for specific responses to electric or magnetic fields. In embodiments of the kind illustrated in FIGS. 8F and 8G, the presence of multiple independent conductive structures on the same diaphragm enable a first part of the diaphragm to respond in a first manner to a change in electric or magnetic field and a second part of the diaphragm to respond in a second manner to said change in electric or magnetic field—thereby creating a plurality of individually actuable regions within a single diaphragm, and enabling a highly tunable diaphragm response.

Figure 8A:
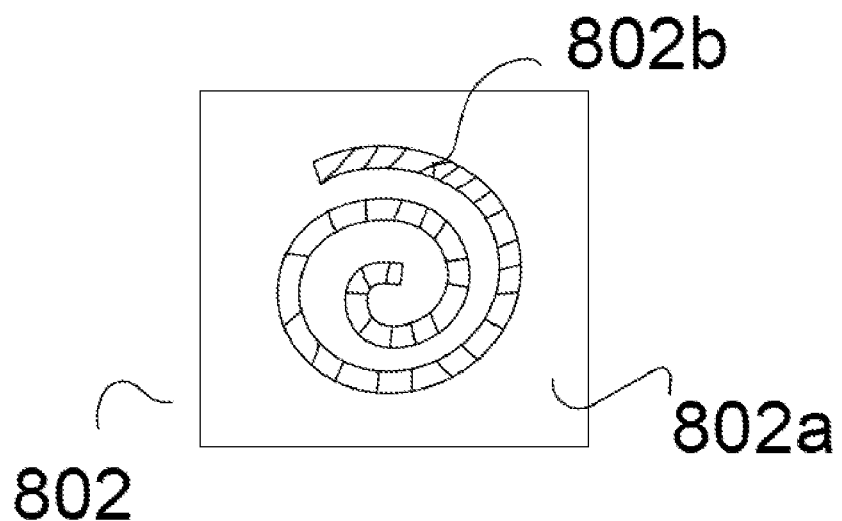
FIGS. 8A to 8K, 9A, 9C, 9D, 10A, 10B and 11 illustrate embodiments of a diaphragm surface having one or more conductive structures disposed thereon.
Figure 8B:
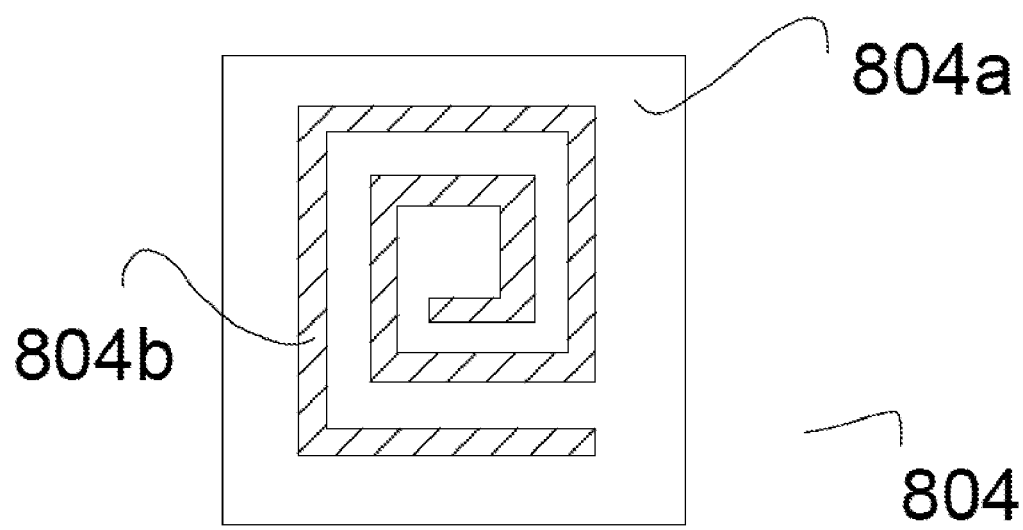
Figure 8C:
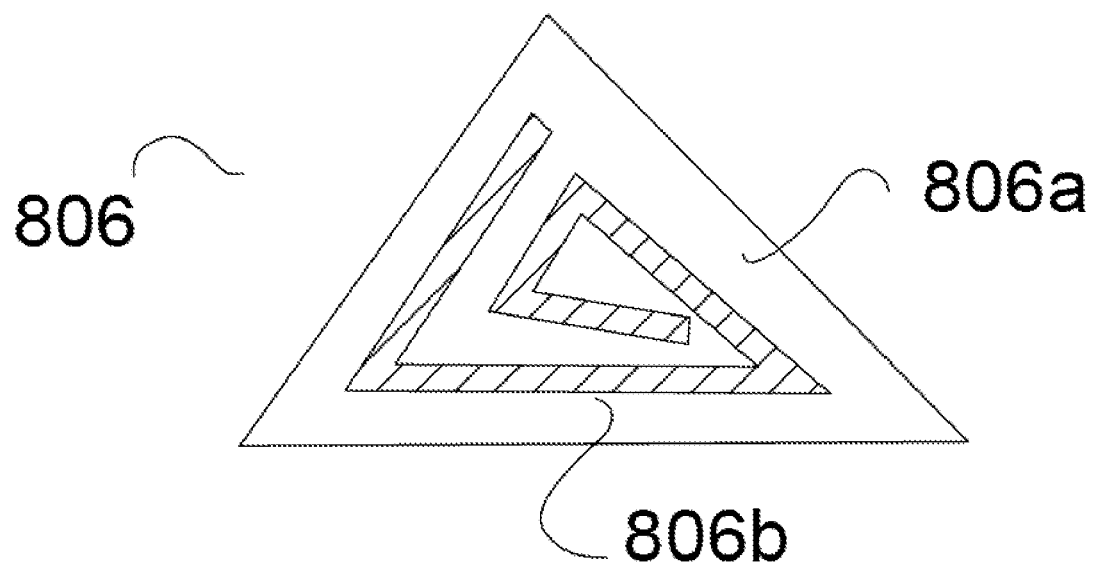
Figure 8D:
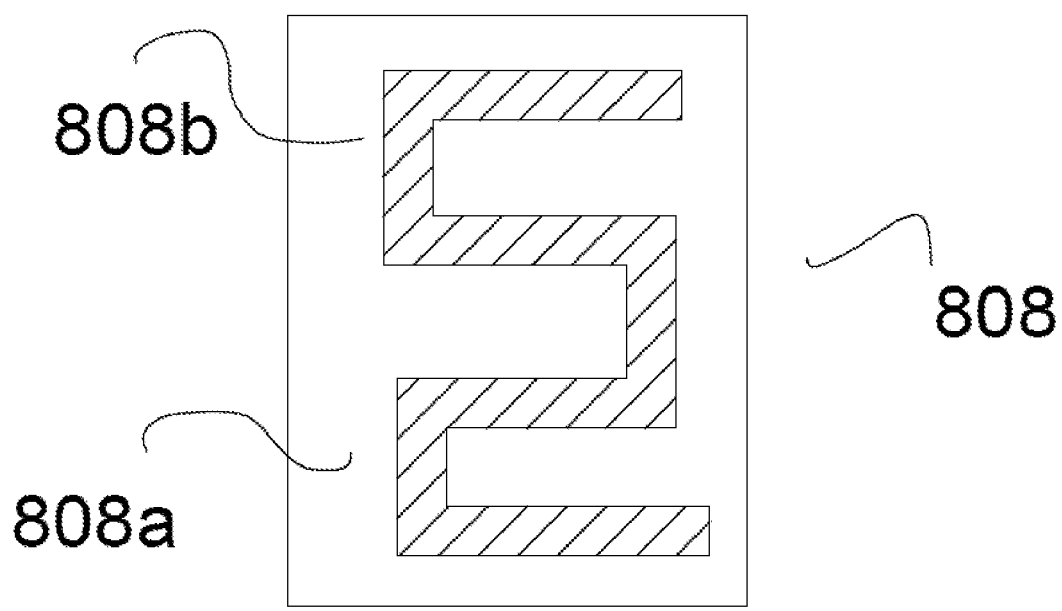
Figure 8E:
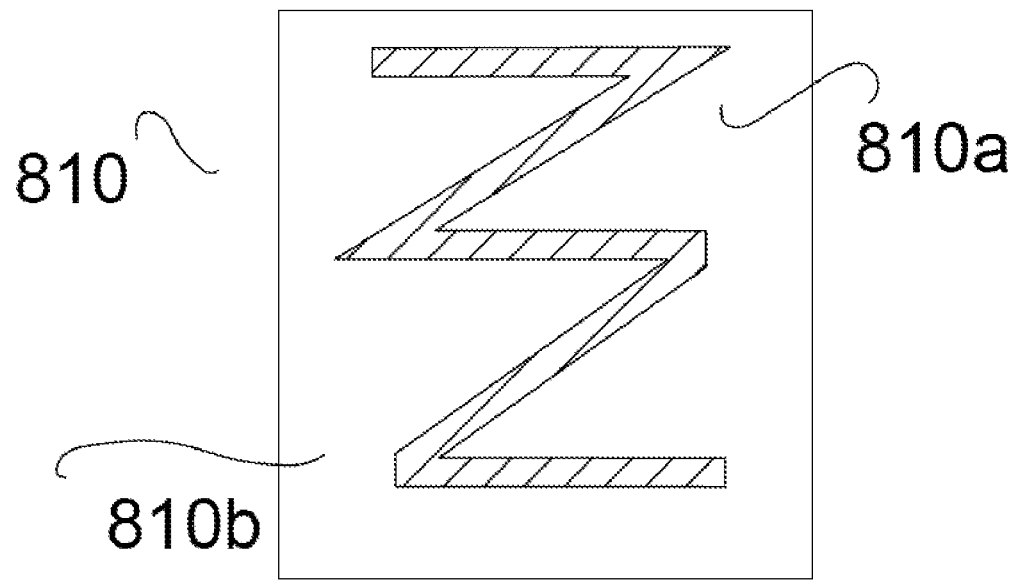
Figure 8F:
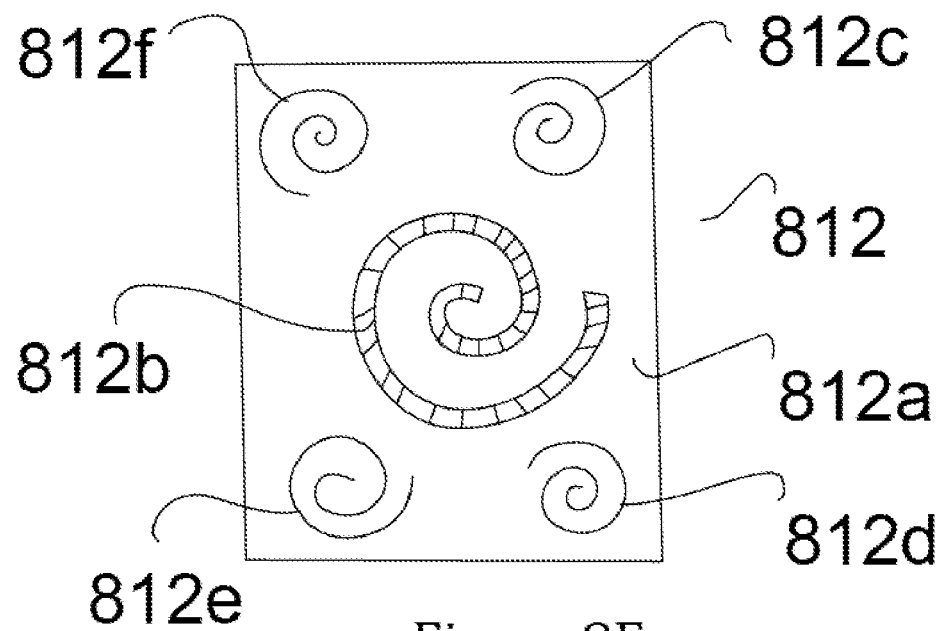
Figure 8G:
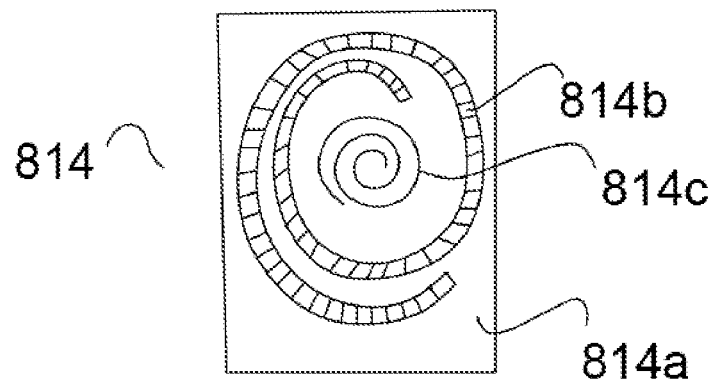
Figure 8H:
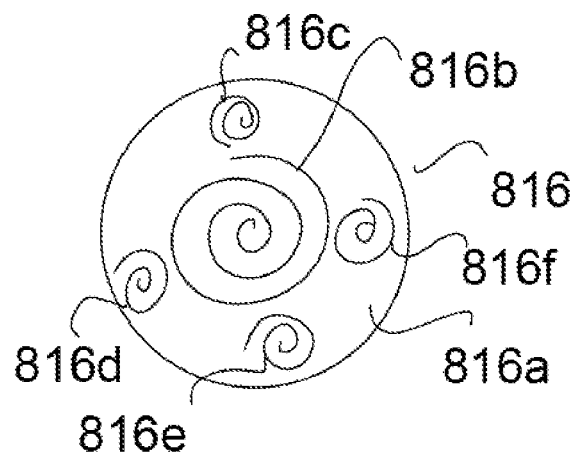

In the illustration of FIG. 8H, diaphragm 816 comprises diaphragm surface 816a, having provided thereon, a first spiral shaped conductive structure 816b located at the centre of diaphragm surface 816a, and having second, third, fourth and fifth spiral shaped conductive structures 816c, 816d, 816e and 816f (each of which is relatively smaller in size in comparison with first spiral shaped conductive structure 816b) disposed around said first spiral shaped conductive structure 816b.

Figure 8I:
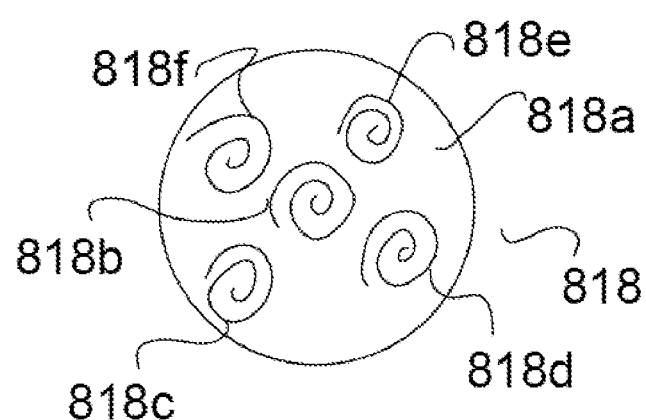

In the illustration of FIG. 8I, diaphragm 818 comprises diaphragm surface 818a, having provided thereon, a first spiral shaped conductive structure 818b located at the centre of diaphragm surface 818a, and having second, third, fourth and fifth spiral shaped conductive structures 818c, 818d, 818e and 818f (each of which is substantially the same size as first spiral shaped conductive structure 818b) disposed around said first spiral shaped conductive structure 818b.

By varying the configuration and location of the conductive structures, different regions of the diaphragm may be tuned for a different acoustic response.

In yet another embodiment, a plurality of independent conductive structures may be connected to a plurality of independent input signal streams, each input signal stream corresponding to a signal/music channel—thereby creation a speaker assembly capable of generating multi-channel sound through a single diaphragm.

In certain embodiments, the size or dimensions of the conductive structure may be varied to configure the response of the diaphragm. In particular embodiments, the dimensional characteristics of a conductive structure at a first part of the diaphragm may be different from the dimensional characteristics of a conductive structure at a second part of the diaphragm, resulting in different acoustic responses of said first and second parts of said diaphragm to a change in state, for example a change in electric, magnetic or electrostatic field.

Figure 9A:
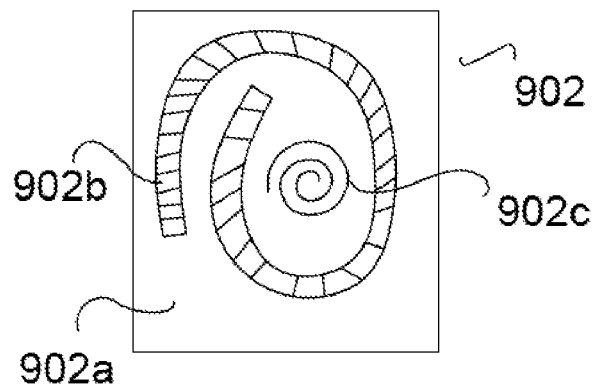

In the embodiment illustrated in FIG. 9A, diaphragm 902 comprises diaphragm surface 902a having a first conductive structure 902b and a second conductive structure 902c disposed thereon, wherein the width of the first conductive structure and the width of the second conductive structure are significantly different. It will be understood that in other embodiments, the shape, length, size, thickness, depth, density, number of turns, or any other dimensional characteristics of the elements of the first conductive structure and the second conductive structure may be different from each other—with a view to ensure a differing response to changes in field.

Figure 9C:
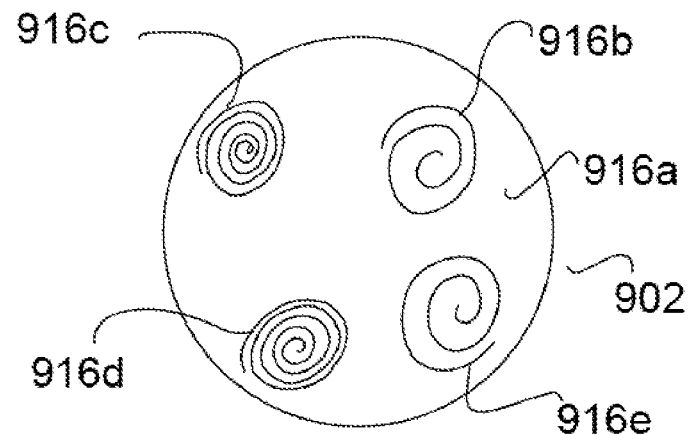

In the illustration of FIG. 9C, diaphragm 916 comprises diaphragm surface 916a, having provided thereon, first, second, third and fourth spiral shaped conductive structures 916b, 916c, 916d and 916e—of which conductive structures 916c and 916d have a higher density of turns than conductive structures 916b and 916e.

Figure 9D:
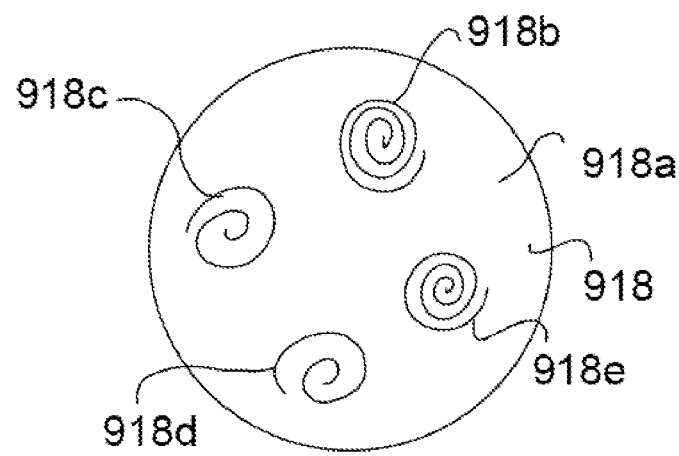

In the illustration of FIG. 9D, diaphragm 918 comprises diaphragm surface 918a, having provided thereon, first, second, third and fourth spiral shaped conductive structures 918b, 918c, 918d and 918e—of which conductive structures 918c and 918d have a lower number of turns than conductive structures 918b and 918e.

By varying the configuration and location of the conductive structures, different regions of the diaphragm may be tuned for a different acoustic response.

It would be understood that by implementing one or more of the above embodiments, a plurality of independent conductive structures may be connected to a plurality of independent input signal streams, each input signal stream corresponding to a signal/music channel—thereby creation a speaker assembly capable of generating multi-channel sound through a single diaphragm.

In other embodiments, the location of a plurality of conductive structures may be precisely selected to configure the diaphragm for desired acoustic responses. For example, and without limitation, in various embodiments, the conductive structures may be evenly distributed across the diaphragm, or may be distributed more densely towards the centre of the diaphragm, or may be distributed away from the centre of the diaphragm.

In other embodiments, the location of a plurality of conductive structures may be precisely selected to configure the diaphragm for multi-channel sound in a single membrane. For example, and without limitation, in various embodiments, the conductive structures may be evenly distributed across the diaphragm such that no conductive structure may enclose another conductive structure, or may be distributed in concentric patterns of similar shape but increasing distance between the center of the diaphragm and the end of the respective conductive structure that is proximal to the center of the diaphragm.

Figure 9B:
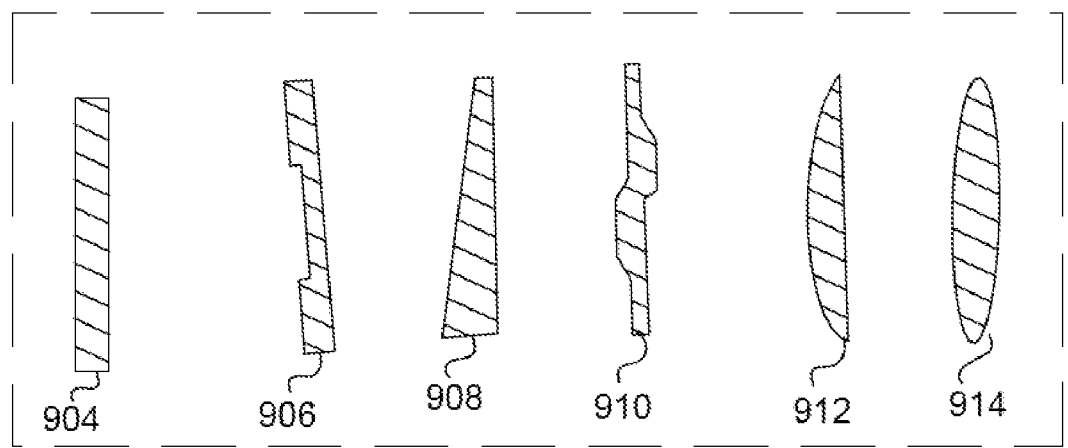
FIG. 9B illustrates diaphragm structures having a plurality of cross-sections.

It would additionally be understood that the acoustic response of a diaphragm may also be varied by changing the thickness of the diaphragm itself, including in some embodiments, by having multiple regions within a single diaphragm, each having a different thickness. FIG. 9B illustrates a plurality of exemplary diaphragm cross-sections, wherein diaphragm 904 has a uniform cross-section, whereas diaphragms 906, 908, 910, 912 and 914 have non-uniform cross sections.

It would be understood that while all of the above configurable parameters have been described in connection with diaphragm embodiments having conductive structures thereon, the teachings are equally applicable to depositing, affixing or embedding charged particles or magnetically sensitive particles onto or within a diaphragm surface. Specific parameters that may be varied in such embodiments, include choice of charged particles or magnetically sensitive particles, size of particles, density of particles on/in the surface, arrangements or patterns of particle application and magnetization level and/or coercivity of particles.

Characteristics of the diaphragm surface that may be varied for the purposes of tuning an acoustic response may include choice of diaphragm material, thickness of diaphragm (with a uniform cross section), variability of diaphragm thickness (when the diaphragm has a non-uniform cross-section), and external tension of the diaphragm.

In an embodiment of the invention, external tension of the diaphragm is adjustable by adjusting one or more diaphragm mounts, tethers or tensioning adjusters (for example tensioning rods). In more particular embodiments, the tension of the diaphragm may be adjusted manually or algorithmically.

In other embodiments of the invention, diaphragm characteristics may be varied by having a variable number of retainers or tethers, positioning of said retainers or tethers and structural characteristics of such retainers or tethers—(for example spring constant).

Speaker Assembly Having Matched Conductor Shape and Magnetic Material Shape

In an embodiment of the invention, a speaker assembly may comprise a first surface having a conductive structure disposed thereon and a second surface having a magnetic or magnetically sensitive structure disposed thereon, wherein said first and second surfaces are configured such that application of an electrical field across or a current through the conductive structure results in movement of one of the first and second surfaces relative to the other of said first and second surfaces. In this embodiment, the conductive structure disposed on the first surface and the magnetic or magnetically sensitive structure disposed on the second surface are structurally substantially identical—which has been found to result in the speaker assembly demonstrating linear acoustic response characteristics. It has been found that combining structurally identical shapes for the conductive structure and the magnetic or magnetically sensitive structure, with the further application of additive/subtractive techniques for generating said conductive structure and/or magnetic or magnetically sensitive structure offers multiple improvements over other speaker assemblies, including, but not limited to efficiency, fidelity, sensitivity, simpler design, structure, weight, size, costs, form factors and applications not previously possible.

It has been found that certain relative arrangements of the conductive structure and the magnetic or magnetically sensitive structures presents yet more improved performance. For example, in one embodiment, the two structures are adjacent to each other but neither one encloses the other, relative motion of one with respect to the other is perpendicular to the planes of said structures. In another embodiment, the two structures may be adjacent to each other such that one encloses the other, in which case relative motion between the two structures is within the plane of the two structures—resulting in a shape-changing (expanding/contracting) structure.

Figure 10A:
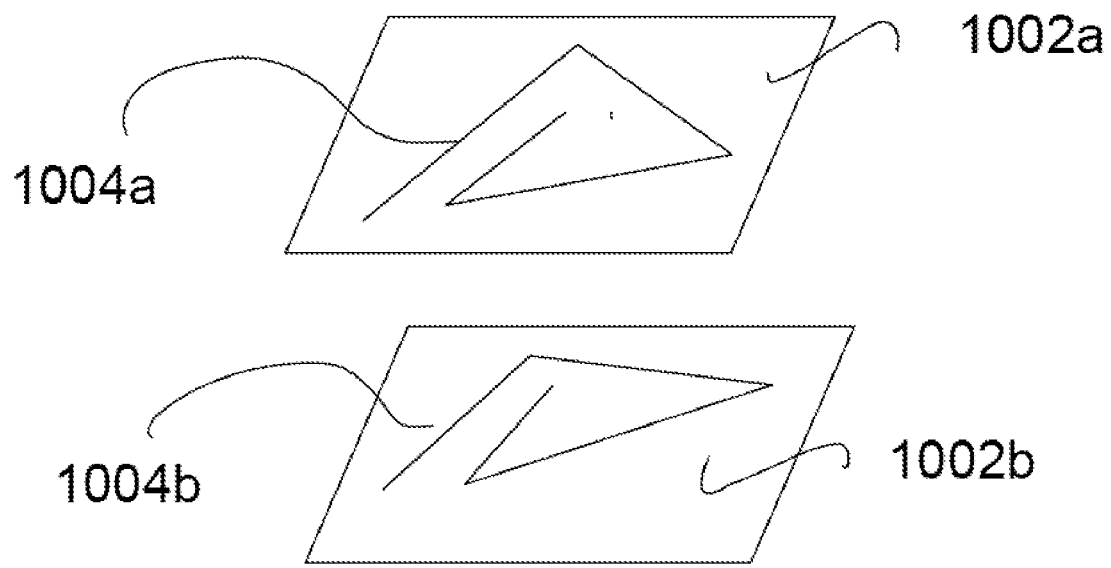
Figure 10B:
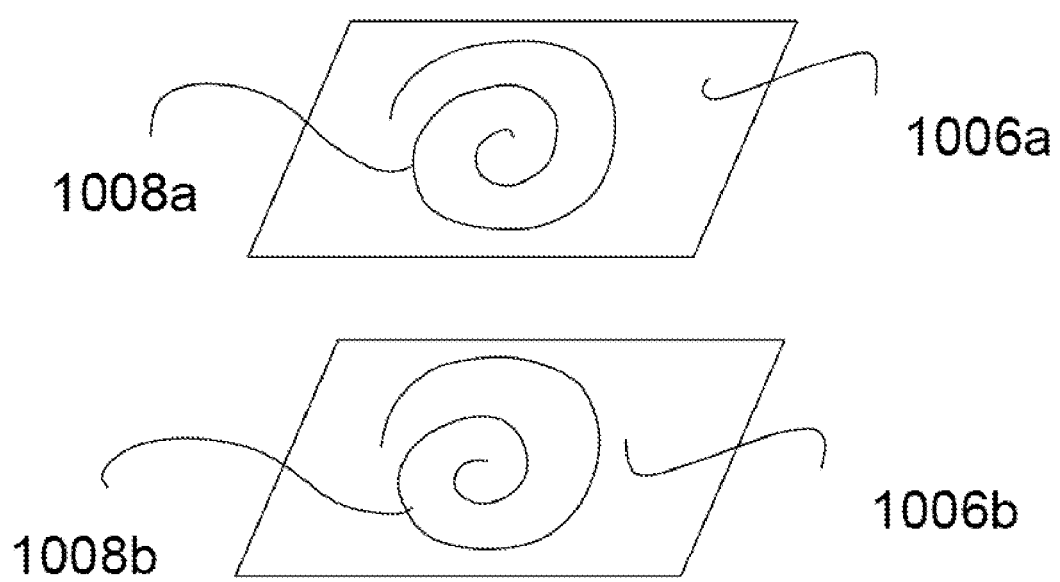

FIG. 10A illustrates an embodiment of the speaker assembly having a first surface 1002a and a second surface 1002b, wherein triangular conductive structure 1004a disposed on first surface 1002a and corresponding triangular magnetic structure 1004b disposed on second surface 1002b have substantially the same structure. FIG. 10B illustrates an embodiment of the speaker assembly having a first surface 1006a and a second surface 1006b, wherein spiral conductive structure 1008a disposed on first surface 1006a and corresponding spiral magnetic structure 1008b disposed on second surface 1006b have substantially the same structure.

Speaker Assembly Having Passive or Active Damping

In an embodiment of the invention, a diaphragm surface of the speaker assembly is provided with a plurality of discrete conductive structures. Said diaphragm surface comprises at least a primary current carrying conductive structure (i.e. primary driving conductive structure), wherein application of current through said conductive structure causes the diaphragm to move in the direction of or away from a second surface or from a magnetic or electrostatic or electric field associated with said second surface. The diaphragm surface is additionally provided with one or more secondary conductive structures which either may or may not be current carrying.

Figure 11:
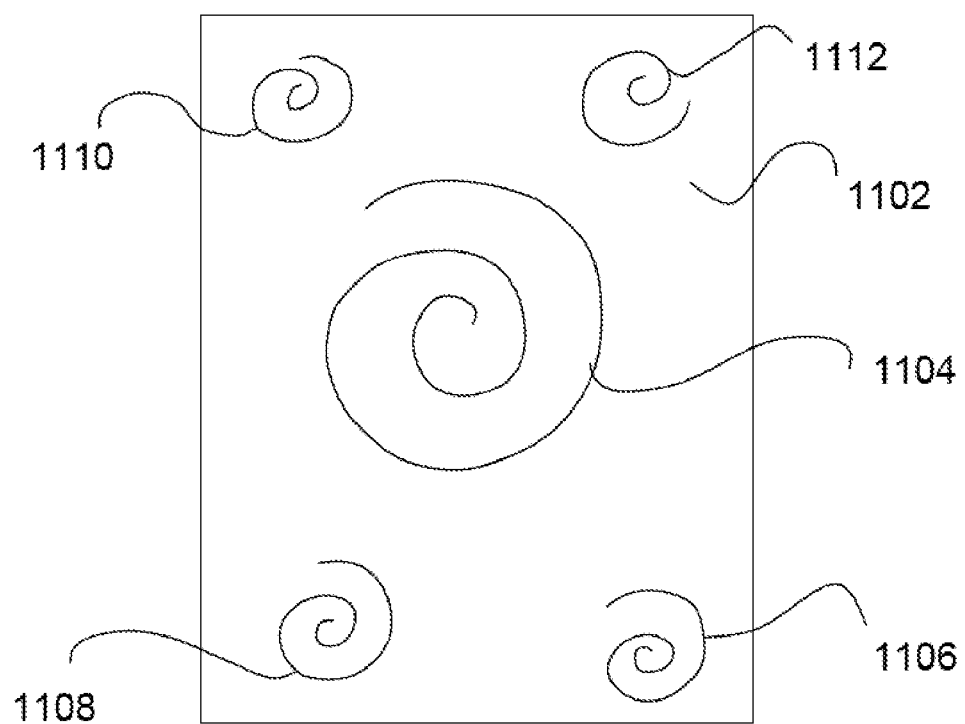

In the embodiment illustrated in FIG. 11, diaphragm surface 1102 has disposed thereon primary current carrying conductive structure 1104, and a plurality of secondary conductive structures 1106 to 1112. In embodiments where one or more of the secondary conductive structures are passive structures (conductive structures whose both ends are connected to each other), movement of the diaphragm causes said secondary conductive structures to move through the electrostatic field generated by the second surface, thereby generating an electromotive force and induced current and an electrostatic field corresponding to each secondary conductive structure. In embodiments of the invention the one or more secondary conductive structures may be configured and located such that the interaction between the electrostatic field created by the primary current carrying conductive structure and said generated electrostatic field about each secondary conductive structure opposes the direction of diaphragm motion—and acts as a damping mechanism for controlling and fine-tuning diaphragm response.

In other embodiments of the invention, the one or more secondary conductive structures may be active and excited by an external excitation source—configured and located such that the electrostatic field(s) generated by each secondary conductive structure interacts with the electrostatic field associated with the second surface, and depending on configuration and location of the secondary conductive structure, either opposes or supplements the direction of motion of the diaphragm. In specific embodiments, one or more of the secondary conductive structures can be driven by a direct current whose magnitude and direction may be change! active signal applied thereto.

In particular embodiments, one or both of the primary and secondary conductive structures are configured to have a variable loop length and!or variable number of turns—such that the effective loop length and!or number of turns can be changed by shorting, thereby adjusting the strength of the corresponding electric field generated by said loop. It would be understood that the variable loop length provides further mechanisms for fine tuning acoustic response of the speaker assembly.

Figure 8J:
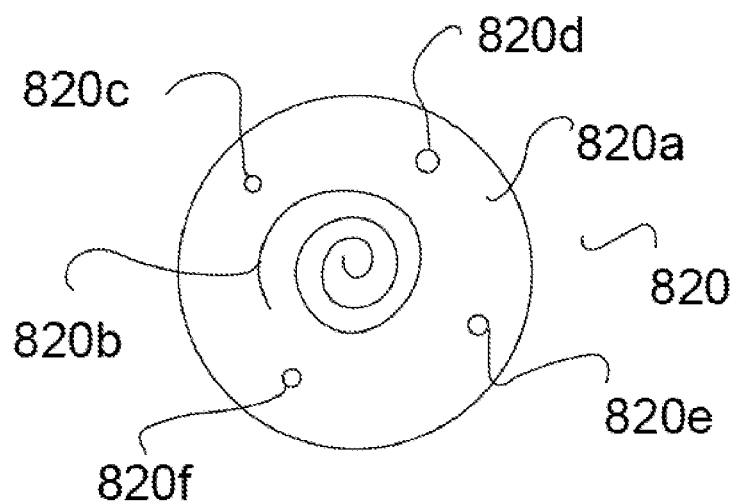

In an embodiment of the invention illustrated in FIG. 8J, diaphragm 820 comprises diaphragm surface 820a, having provided thereon, a first spiral shaped conductive structure 820b located at the centre of diaphragm surface 820a, and having second, third, fourth and fifth spiral shaped conductive structures 820c, 820d, 820e and 820f disposed around said first spiral shaped conductive structure 820b. In the illustration, first spiral shape conductive structure is a primary conductive structure configured for being driven by a direct current ! active signal, while each of second, third, fourth and fifth spiral shaped conductive structures 820c, 820d, 820e and 820f are closed loop structures that do not carry current ! an active signal. By selecting the number and position of primary current carrying conductive structures and secondary closed loop structures, the diaphragm may be tuned for a specific acoustic response.

Figure 8K:
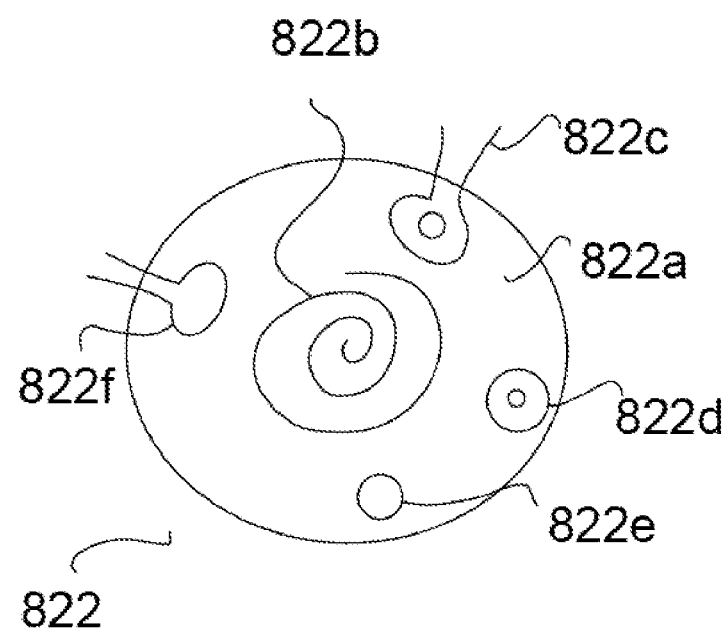

In an embodiment of the invention illustrated in FIG. 8K, diaphragm 822 comprises diaphragm surface 822a, having provided thereon, a first spiral shaped conductive structure 822b located at the centre of diaphragm surface 822a, and having second, third, fourth and fifth spiral shaped conductive structures 822c, 822d, 822e and 822f disposed around said first spiral shaped conductive structure 822b. In the illustration, (i) first spiral shaped conductive structure 822b is a primary conductive structure configured for being driven by a direct current ! active signal, (ii) second spiral shaped conductive structure 822c is a conductive structure comprising a closed loop surrounded by a closable loop that can be selectively configured to carry a direct current/active signal or selectively shorted, (iii) third spiral shaped conductive structure 822d is a conductive structure configured to carry a direct current/active signal, (iv) fourth spiral shaped conductive structure 822e is a conductive structure comprising a single closed loop and (v) fifth spiral shaped conductive structure 822f is a conductive structure comprising two concentrically disposed closed loops. By selecting the number position any type of current carrying conductive structures and closed loop structures, the diaphragm may be tuned for a specific acoustic response.

Rotary Speaker Assembly

In an embodiment of the invention, the speaker assembly may comprise a rotary speaker, wherein rotational speed may be varied for the purposes of modulation of sound.

Sound is produced by moving a medium such as air and modulating it to create pressure changes in it that are a function of the input (audio) signal. In a typical speaker both of these functions are implemented by the same moving surface(s) via a common drive/control mechanism.

It is however possible to have the functions implemented via a plurality of mechanisms, namely a first mechanism for creating the flow of air and a second mechanism for modulation of air flow to implement characteristics of the input audio signal such as amplitude, frequency, phase. In such embodiments, the power/energy and modulation are handled by two separate systems—which approach may obviate the need of a traditional audio signal amplifier.

Creation of such an air flow is achieved by movement of a plurality of structures such as wings, blades, sails and the like. An airfoil is the shape of such a structure.

Apparatuses or systems of the above type can be broadly classified into 2 categories based on how the airflow is created—namely, 1) via oscillatory motion (e.g. angular, linear etc.), and
2) via rotational motion Prior art techniques have involved modulation of air flow for sound production primarily by control of the pitch of the blades, with further specific emphasis on linear or torsional control of the pitch.

The present invention provides novel techniques to modulate the air flow and create sound. The techniques include:

1) changing of the airflow characteristic of the airfoil by means such as volume change, direct shape change, including folding and effective shape change by airfoil controls including but not limited to the use of one or more of the following—rudder, elevator, aileron, damper, spoiler, elevon, stabilator, flap, flaperon, trim tab, balance tab, anti-balance tab, servo tab, slat, slot, airfoil area change, moment of inertia etc.
2) changing the direction and/or rate of motion and higher order derivatives of such rate on a static and/or dynamic basis.

The required control may be effected via one or more actuators that may themselves be effected by multiple means, including but not limited to electromagnetic (e.g. solenoid, motor), electric (e.g. piezo, including bimorph, multi-morph), electrothermal (e.g. bimetallic strip, heated fluid), fluid flow (e.g. hydraulic, pneumatic) etc.

Further, such actuator may affect said control by one or more of the following—rods, oscillatory discs, gears, pulleys, belts, chains, single-link/multi-link link plates, swashplates, hydraulic hose, slip ring, commutator, mercury contact, inductive, capacitive, wireless, optical etc.

In an embodiment, the control method/implementation may be integrated into the blade structure itself resulting in reduction in noise, design/manufacturing complexity, cost etc., enhancements in efficiency, reliability, performance, fidelity, sensitivity etc.

In an embodiment of the invention, one or more external structures may be used to direct and/or restrict the airflow to a desired area and/or direction thereby effectively acting as a sound waveguide.

These various methods may further be severally combined to create additional realizations and/or enhancements. Exemplary realizations include multiple drivers optimized for specific parameters, e.g. frequency response, multiple driver arrangement in a co-axial placement etc.

FIGS. 12A to 12D illustrate a first exemplary embodiment of this invention aspect—comprising motor 1200a and rotating blades 1200b to 1200f rotatably mounted on said motor. In a first mode of operation, illustrated in FIG. 12A the blades 1200b to 1200f have a first blade shape, while in a second mode of operation illustrated in FIG. 12C, the blades 1200b to 1200f have a second blade shape that is different from the first blade shape. FIGS. 12B and 12D further illustrate the different blade shape of blades 1200b in the first and second modes of operation respectively. As discussed above, the change in shape between a first and second mode of operation may be achieved by any appropriate actuator(s) including without limitation, electromagnetic (e.g. solenoid, motor), electric (e.g. piezo, including bimorph, multi-morph), electrothermal (e.g. bimetallic strip, heated fluid), fluid flow (e.g. hydraulic, pneumatic) etc. In the embodiment of FIGS. 12A to 12D, modulation of air flow is primarily effected by varying the shape of the blades. This is achieved via any of the means described above. In a preferred embodiment, there is no hub to connect the blades and hence control of the blades is not effected by a hub structure. Further, since in this embodiment the blades are fixed relative to the rotor, air flow change and hence generation of sound is not effected by blade pitch change via torsion control.

FIGS. 12E, 12F and 12F-F illustrate a different structure 1208, where rotating blades 1208b to 1208f are respectively mounted on an external cylindrical structure 1208a, each blade being mounted on said structure by one or more pivots or other appropriate connectors or mounts 1208g to 1208k. As a result of the pivotable mounting of blades on cylindrical structure, the position of such blades can be selectively altered (for example in the manner shown in FIGS. 12E and 12F—from at least a first position to a second position), thereby modulating the air flow over the blades. It would be understood that while FIGS. 12E and 12F illustrate top views of structure 1208, FIG. 12F-F illustrates a cross-sectional view of said structure 1208, and its components—cylindrical structure 1208a, blades 1208b, 1208c and 1208d, and corresponding pivotable mountings 1208g, 1208h and 1208i.

Once again, it is noteworthy that there is no hub to connect the blades and hence control of the blades is not effected by a hub structure. Modulation of air flow is primarily achieved by varying the effective pitch of the blades. The pitch control may be achieved via any of the means described above.

In a further embodiment 1212 illustrated in FIG. 12G, the exemplary cylindrical structure 1208a or the rotating blade assembly may be surrounded by an external cylindrical structure 1212a—which may be used as a sound waveguide.

FIGS. 12H to 12K illustrate an example embodiment of an apparatus 1214 comprising a motor 1214a and a plurality of blades 1214b to 1214d that are rotating about the axis of rotation of motor 1214a. It is noteworthy that in this embodiment the blades are arranged such that there is a torque generated across the edges of the blade. Modulation of air flow is primarily achieved by varying the effective pitch of the blades by moving the blade structure in a manner similar to the opening/closing of flower petals or an umbrella. The pitch control is done via one or more actuators that may themselves be effected by multiple means described earlier, and is not limited to electromagnetic. FIG. 12H provides a side view and FIG. 12J provides a front view of a first mode of operation where blades 1214b to 1214d are relatively close to each other (in a somewhat compressed or semi-closed configuration), whereas FIG. 12I provides a side view and FIG. 12K provides a front view of a second mode of operation of a second mode of operation where blades 1214b to 1214d are arranged in a spread-out configuration. By toggling between the first and second mode of operation (and other such modes of operation), apparatus 1214 can modulate the flow of air, and correspondingly the generation of sound based on the generated air flow.

FIG. 12L illustrates an exemplary blade 1214b of the type described above, and shows the direction of torque generated across the ends of said blade by virtue of airflow passing over it.

FIGS. 12M to 12O illustrate embodiments of the invention, where the motor has a set of paired blades rotatably mounted thereon, wherein each intra-pair blade is capable of being controllably moved closer or further to the other intra-pair blade. In FIGS. 12M and 12N, the apparatus 1224 comprises motor 1224a having a set of six rotating blades 1224b to 1224g—comprising three sets of paired blades, namely first pair 1224b, 1224c, second pair 1224d, 1224e and third pair 1224f, 1224g. In a first mode of operation illustrated in FIG. 12M, each of the two blades within each pair of blades is offset from the other—such that when viewed along a longitudinal axis, all six blades are simultaneously visible. In a second mode of operation illustrated in FIG. 12N, each of the two blades within each pair of blades is aligned with the other—such that when viewed along a longitudinal axis, only one blade 1224b, 1224e, 1224g out of each blade pair is visible. FIG. 12O illustrate a more particular embodiment 1228 of the arrangement 1224 more generally illustrated in FIGS. 12M and 12N—wherein each pair of blades 1228b and 1228c, 1228d and 128e, and 1228f and 1228g comprise an intra-connected or intra-tethered pair, wherein blades within each pair are connected to each other using tethers or other fasteners 1228h, 1228i and 1228j. The tethers of fasteners are selected to limit the maximum permissible separation of blades within each blade pair. It would be understood that actuation of relative movement between blades within each blade pair can be achieved in any number of ways, including based on any one or more actuators discussed above.

FIG. 12P illustrate a perspective view, and FIG. 12Q illustrate a front view of another arrangement 1230 wherein two distinct sets of blades 1230a and 1230b are mounted along a common axis. By controlling the relative rotation and/or relative separation of the two distinct sets of blades, the airflow arising from said blades may be controlled.

FIG. 12R illustrates a different embodiment 1232 of the invention where two separate motors 1232a, 1234a and corresponding blade assemblies 1232b, 1234b are used for modulating airflow. By modulating the respective airflows caused by one or both of the two assemblies, the overall airflow (and sound generated by such airflow may be modulated)

FIGS. 12S, 12T and 12 T-T illustrate yet another embodiment 1234 of the invention, wherein shape/control surface characteristics of an oscillatory surface may be changed using piezoelectric bimorphs. In the illustration, oscillatory motor 1234a has an oscillatory surface 1234b mounted thereon—wherein oscillatory surface 1234b has a plurality of piezoelectric bimorphs 1234c to 1234e provided thereon. FIG. 12S illustrates a first mode of operation, wherein signals transmitted to the piezoelectric bimorphs causes oscillatory surface 1234b to assume a contracted shape, while FIG. 12T illustrates a second mode of operation, wherein signals transmitted to the piezoelectric bimorphs causes oscillatory surface 1234b to assume an expanded shape. By changing the shape of oscillatory surface 1234b, the invention controls the airflow generated by oscillation of said oscillatory surface and one or more of other methods including but not limited to pitch control, shape control or any other method described previously, and accordingly controls the resulting acoustic signal. FIG. 12T-T shows a side view of embodiment 1234—with a view to illustrate the oscillating motion of oscillatory surface 1234b caused by oscillatory motor 1234a.

Membrane/Diaphragm Construction

In order to displace air, ideally the diaphragm/surface needs to be stiff so as not to be deformed itself thereby losing efficiency as well as introducing distortion in the displaced air However, the usual way to achieve stiffness is by making the diaphragm/surface strong which involves appropriate bracing and other methods and hence adds weight which then reduces efficiency and hence fidelity.

The invention provides a very lightweight but stiff diaphragm/surface. The diaphragm material consists of a layer of hollow and hence lightweight material that can maintain its shape under stress and motion, such as polymer foam. This is then further strengthened by covering it from all sides with a very thin layer of a membrane like material such that it encapsulates it completely and imparts strength and structural integrity.

In a preferred embodiment illustrated in FIGS. 12U and 12V, the invention provides an additional structure 1238 that has been found to have exception strength and/or stiffness while providing significant weight related advantages (i.e. which is significantly lighter than known structures). The structure 1238 include two thin membranes 1238a and 1238b (or a single membrane folded over itself) of a non-porous material that may be placed on top of each other (preferably separated by a spacer 1238d of the type discussed previously in this specification) and sealed at the edges. Pressurized gas (e.g. air) may then be introduced into the resulting sealed compartment. The tendency of the gas to expand grants the entire structure rigidity and hence stiffness while being extremely light. Optionally, a lightweight mechanism may be used to prevent the entire structure from expanding unevenly like a balloon or a lens. e.g. one or more fasteners 1238c, 1238e (for example, rivets, star staples, wire or other fasteners). The structure may be stiffened by use of an internal spacer 1238 that is light and strong to bolster structural integrity. e.g. light, hollow tube. Such a diaphragm may be used in both constrained or unconstrained applications for generation of acoustic signals, and has been found to be very light but stiff, thereby increasing efficiency, fidelity, power, simplifies design/manufacturability, while reducing cost.

Additionally, conductors or magnetic material may be paired with the diaphragm on the outside surface(s) or even on the inside surfaces for greater integrity and/or reliability.

Drum Assembly

In an embodiment of the invention, one or more of the assemblies may be implemented as a drum assembly, wherein the drum diaphragm may have any one or more of the diaphragm characteristics discussed above, and acoustic or percussion response of the drum diaphragm may be tuned using any means apparent to the skilled person, including without limitation stepper motors, or the torsion screws or other mechanisms discussed above.

FIG. 13 illustrates an exploded view of an exemplary drum assembly 1300 comprising drum body 12302, a first surface 1306 having a conductive structure 1306 formed thereon, and a second surface 1308 having magnetic or magnetically sensitive particles disposed thereon.

It would be understood that by implementing the combination of the conductive structure and the magnetic or magnetically sensitive structure in accordance with above described assemblies of the present invention within a drum assembly, the invention permits for multiple end-use applications including (i) a combined drum/speaker (ii) combined drum/microphone (iii) combined drum/speaker/microphone or (iv) a finely tunable drum. As discussed above, the drum assembly may be passive or standard, internally actively fine tunable or tensioned, or externally tunable or tensioned (either manually or algorithmically).

Built In-Microphone Assembly

A significant feature of this invention is the creation of an inherent built-in microphone using any of the assemblies or configurations described above. The microphone can be used in multiple modes namely, speaker only, microphone only, speaker/noise-cancellation (NC) combination mode. This has further applications in noisy environments e.g. Workplaces, vehicles etc. The microphone's significantly larger sound collection area makes it highly sensitive and hence deployable in a wide variety of applications. The thin-ness of the assembly furthers the applications it can be used in.

The thin/flat sound technology is fully applicable for the entire sound range. The system can take various forms, including but not limited to, stand-alone, stand/wall/ceiling/door mounted, furniture mounted (e.g. table underside, chair back/headrest), vehicle headrest (with or without standard/custom/per-ear active noise cancellation), wrapped around/integrated into another object e.g. lamp shade, light fixture, or in personal/portable form e.g. headphones, earphones, purses etc. leaving potential forms and/or applications to the imagination.

All applications can further be used in various modes—speaker only, microphone only, speaker/microphone combination mode for active noise reduction/cancellation. The applicable mode may be dynamically selected by the user and/or application.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

What is claimed is:

1. An assembly for generating sound, comprising:
   one or more airflow generating surfaces configured such that movement of said airflow generating surfaces generates an airflow, wherein said one or more airflow generating surfaces are configured for reciprocating motion, cyclical motion, rotational motion or elliptical motion;
   a first mechanism configured for generating an airflow, the first mechanism comprising a driver configured for driving the one or more airflow generating surfaces from a first position to a second position in causing movement of the one or more airflow generating surfaces to generate airflow; and
   a second mechanism configured for airflow modulation, wherein the second mechanism comprises one or more actuators configured for said airflow modulation.

2. The assembly as claimed in claim 1, wherein each of the one or more airflow generating surfaces comprises a rotating blade rotatably mounted on a motor;
   and wherein the assembly for generating sound is selectively switchable between a first mode of operation and a second mode of operation, wherein:
   in the first mode of operation, each said rotating blade has a first blade shape;
   in the second mode of operation, each said rotating blade has a second blade shape that is different from the first blade shape; and
   a change in blade shape of each rotating blade from the first blade shape to the second blade shape is effected by said one or more actuators.

3. The assembly as claimed in claim 1 wherein a first actuator among the one or more actuators is any of an electromagnetic actuator, an electric actuator, an electrothermal actuator, a solenoid actuator, a motor actuator, a piezo actuator, a bimetallic strip actuator, a heated fluid actuator, a fluid flow actuator, a hydraulic actuator or a pneumatic actuator.

4. The assembly as claimed in claim 1, wherein:
   each of the one or more airflow generating surfaces comprises a blade mounted on an external cylindrical structure; and
   each said blade is mounted on the external cylindrical structure, such that the position of said blade is selectively alterable from a first position to a second position for modulating airflow.

5. The assembly as claimed in claim 4 wherein at least one of the external cylindrical structure and at least one of the rotating blades are surrounded by a structure that is configured to form a sound waveguide.

6. The assembly as claimed in claim 1, wherein said one or more airflow generating surfaces includes a plurality of airflow generating surfaces, wherein each of the airflow generating surfaces comprises a rotating blade rotatably mounted on a motor;
   and wherein the assembly for generating sound is selectively switchable between a first mode of operation and a second mode of operation, wherein:
      in the first mode of operation the rotating blades are in a first configuration;
      in the second mode of operation the rotating blades are in a second configuration;
      wherein the rotating blades are positioned relatively closer to each other in the first configuration and are positioned relatively further from each other in the second configuration;
   and wherein the assembly for generating sound is switched between the first mode of operation and the second mode of operation by said one or more actuators.

7. The assembly as claimed in claim 6, wherein the rotating blades are arranged such that airflow over said rotating blades generates torque across edges of said rotating blades.

8. The assembly as claimed in claim 6, wherein the rotating blades are arranged in a petal configuration or an umbrella configuration.

9. The assembly as claimed in claim 1, wherein said one or more airflow generating surfaces includes a plurality of airflow generating surfaces, wherein each of the airflow generating surfaces comprises a rotating blade rotatably mounted on a motor;
   wherein the rotating blades are mounted on the motor in a paired configuration, and the rotating blades comprise a plurality of sets of paired blades;
   wherein a first intra-pair blade within each set of paired blades is controllably moveable closer to or further away from a second intra-pair blade within said set of paired blades.

10. The assembly as claimed in claim 9, wherein the assembly for generating sound is selectively switchable between a first mode of operation and a second mode of operation, wherein:
    in the first mode of operation the first intra-pair blade within each set of paired blades is offset from the second intra-pair blade within said set of paired blades;
    in the second mode of operation the first intra-pair blade within each set of paired blades is aligned with the second intra-pair blade within said set of paired blades;
    and the assembly for generating sound is switched between the first mode of operation and the second mode of operation by said one or more actuators.

11. The assembly as claimed in claim 10, wherein the first intra-pair blade within each set of paired blades is tethered or fastened to the second intra-pair blade within said set of paired blades, such that the maximum separation of the first and second intra-pair blades is limited.

12. The assembly as claimed in claim 1, wherein the one or more wave airflow generating surfaces comprise two distinct sets of blades mounted along a common axis, and configured such that at least one of relative rotation or relative separation of the two distinct sets of blades is controllable to control the airflow from said sets of blades.

13. The assembly as claimed in claim 1, comprising:
    two motors, each motor having a corresponding blade assembly mounted thereon;
    wherein each of the two motors are controllable to modulate respective airflows caused by their corresponding blade assemblies, to control the overall airflow;
    wherein the one or more airflow generating surfaces comprise two distinct sets of blades mounted along a common axis, and configured such that the relative rotation or relative separation of the two distinct sets of blades is controllable to control the airflow from said sets of blades.

14. The assembly as claimed in claim 1, wherein:
    the one or more airflow generating surfaces comprise an oscillatory surface; and
    the assembly for generating sound includes one or more piezoelectric bimorphs configured to control shape or control surface characteristics of said oscillatory surface.

15. The assembly as claimed in claim 14, wherein the assembly for generating sound is selectively switchable between a first mode of operation and a second mode of operation, wherein:
    in the first mode of operation, signals transmitted to the one or more piezoelectric bimorphs impel the oscillatory surface towards a contracted shape; and
    in the second mode of operation, signals transmitted to the one or more piezoelectric bimorphs impel the oscillatory surface towards an expanded shape.

16. The assembly as claimed in claim 1, wherein the one or more actuators of the second mechanism are configured for modulation of airflow generated by driving the one or more of the airflow generating surfaces.

* * * * *